US010638428B2

(12) United States Patent
Choi et al.

(10) Patent No.: US 10,638,428 B2
(45) Date of Patent: Apr. 28, 2020

(54) ELECTRONIC DEVICE USING LOW-POWER WIDE AREA COMMUNICATION TECHNOLOGY AND METHOD FOR OPERATING THE SAME

(71) Applicant: Samsung Electronics Co., Ltd., Suwon-si, Gyeonggi-do (KR)

(72) Inventors: Young-Joon Choi, Uiwang-si (KR); Ki-Won Kim, Yongin-si (KR); Hun-Young Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/120,997

(22) Filed: Sep. 4, 2018

(65) Prior Publication Data

US 2019/0075523 A1   Mar. 7, 2019

(30) Foreign Application Priority Data

Sep. 4, 2017   (KR) ........................ 10-2017-0112605

(51) Int. Cl.
*H04W 4/80* (2018.01)
*H04W 52/02* (2009.01)
*H04L 29/08* (2006.01)
*H04W 84/12* (2009.01)

(52) U.S. Cl.
CPC ......... *H04W 52/0274* (2013.01); *H04L 67/34* (2013.01); *H04W 84/12* (2013.01)

(58) Field of Classification Search
CPC ......... H04W 52/0251; H04W 52/0206; H04W 4/80; H04W 72/1247; H04W 84/12; H04W 88/06; H04W 52/0212; Y02D 70/00
See application file for complete search history.

(56) References Cited

U.S. PATENT DOCUMENTS

| 2015/0003432 | A1* | 1/2015 | Tanaka .................. H04W 36/34 370/338 |
| 2015/0154016 | A1 | 6/2015 | Liang et al. |
| 2015/0327147 | A1* | 11/2015 | Ganesan ............. H04M 1/2535 455/436 |
| 2016/0295569 | A1* | 10/2016 | Braun .................. H04W 52/02 |
| 2017/0195958 | A1 | 7/2017 | Korneluk et al. |
| 2017/0230292 | A1* | 8/2017 | Lau ......................... H04L 47/12 |
| 2018/0062873 | A1* | 3/2018 | Chiang .................. H04W 4/70 |

(Continued)

FOREIGN PATENT DOCUMENTS

CN   102799447 A   11/2012

*Primary Examiner* — Dai Phuong
(74) *Attorney, Agent, or Firm* — Jefferson IP Law, LLP

(57) ABSTRACT

An electronic device is provided. The electronic device includes a housing, a first communication circuit configured to provide first wireless communication using a low power wide area network (LPWAN), a second communication circuit configured to provide second wireless communication using Wi-Fi, a battery configured to supply power to the first communication circuit and the second communication circuit, and a control circuit configured to control the battery to supply power to the first communication circuit as default, determine whether the second communication circuit needs to be used for wireless communication, determine at least one state of the electronic device, and control the battery to supply power to the second communication circuit based on the at least one state.

5 Claims, 24 Drawing Sheets

(56) References Cited

U.S. PATENT DOCUMENTS

2018/0110012 A1* 4/2018 Williams .............. G08C 17/02
2018/0184380 A1* 6/2018 Xue ................. H04W 52/0251
2019/0090115 A1* 3/2019 Yamada ............... H04W 12/04

* cited by examiner

| DATA ATTRIBUTE | COMMUNICATION SCHEME | | IMMINENCE |
| --- | --- | --- | --- |
| | FIRST COMMUNICATION CIRCUIT | SECOND COMMUNICATION CIRCUIT | |
| SECURITY UPDATE | O | O | O |
| SMALL UPDATE | O | O | X |
| LARGE UPDATE | X | O | X |
| WI-FI AP LIST INFORMATION | X | O | X |

FIG.21

ELECTRONIC DEVICE USING LOW-POWER WIDE AREA COMMUNICATION TECHNOLOGY AND METHOD FOR OPERATING THE SAME

CROSS-REFERENCE TO RELATED APPLICATION(S)

This application is based on and claims priority under 35 U.S.C. § 119(a) of a Korean patent application number 10-2017-0112605, filed on Sep. 4, 2017, in the Korean Intellectual Property Office, the disclosure of which is incorporated by reference herein in its entirety.

BACKGROUND

1. Field

The disclosure relates to electronic devices and methods for operating the same using low-power wide area (LPWA) communication technology.

2. Description of Related Art

Recently, owing to the growth of communication technology, internet-of-things (IoT) is actively being developed. Narrowband IoT (NBIOT), which supports low power wide area (LPWA) technologies, also is actively being developed.

NBIOT is a service specified for transmission of a tiny volume of data (temperature/humidity sensor data or location data), and this technology is based on the LPWA technology. For example, electronic devices adopting low-rate IoT communication may be used for power telemetry, management of vehicles or gas facilities, lost child prevention trackers, and location trackers.

Low-rate IoT electronic devices may send out its location information to a managing server to provide the user with information about the current or prior location of the electronic device.

The above information is presented as background information only to assist with an understanding of the disclosure. No determination has been made, and no assertion is made, as to whether any of the above might be applicable as prior art with regard to the disclosure.

SUMMARY

Low-rate internet of things (IoT) electronic devices require that the users themselves connect them to other terminals or personal computers (PCs) to update the firmware or download data.

Low-rate IoT electronic devices may update firmware or download data when simply turning on or off some of their functions without considering their battery power or charged state. As such, various low-rate IoT electronic devices performs updating without considering the power stored in the battery or power consumption needed to update, thereby resulting in an update failure.

Additional aspects will be set forth in part in the description which follows and, in part, will be apparent from the description, or may be learned by practice of the presented embodiments.

Aspects of the disclosure are to address at least the above-mentioned problems and/or disadvantages and to provide at least the advantages described below. Accordingly, an aspect of the disclosure is to provide an electronic device, and a method for operating the same, that adopts a low-power communication scheme, selects an appropriate communication scheme from among a low-power communication scheme and another communication scheme as per the attributes of data for updating and the state of the battery power, and download data and performs update via the selected communication scheme.

In accordance with an aspect of the disclosure, an electronic device is provided. The electronic device includes a housing, a first communication circuit configured to provide first wireless communication using a low power wide area network (LPWAN), a second communication circuit configured to provide second wireless communication using Wi-Fi, a battery configured to supply power to the first communication circuit and the second communication circuit, and a control circuit configured to control the battery to supply power to the first communication circuit as default, determine whether the second communication circuit needs to be used for wireless communication, determine at least one state of the electronic device, and control the battery to supply power to the second communication circuit based on the at least one state.

In accordance with an aspect of the disclosure, an electronic device is provided. The electronic includes a battery, a first communication circuit configured to provide first wireless communication using a LPWAN, a second communication circuit configured to provide second wireless communication using Wi-Fi, and a processor configured to, upon receiving a request for location information about the electronic device, transmit the location information via the first wireless communication of the electronic device, upon receiving a request for updating the electronic device, select the first wireless communication or the second wireless communication to download first data for the update based on at least one of an attribute of the first data or a power state of the battery, and download the first data from a server via the selected wireless communication and perform the update.

In accordance with an aspect of the disclosure, a method for operating an electronic device is provided. The method includes upon receiving a request for location information about the electronic device, transmitting the location information via first wireless communication, upon receiving a request for updating the electronic device, selecting the first wireless communication using a LPWAN or a second wireless communication using Wi-Fi to download first data for the update based on at least one of an attribute of the first data or a power state of a battery included in the electronic device, and downloading the first data from a server via the selected wireless communication and performing the update.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from following description when considered in connection with the accompanying drawings, in which:

FIG. 21 is a table illustrating an example of determining a communication scheme as per attributes of data according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
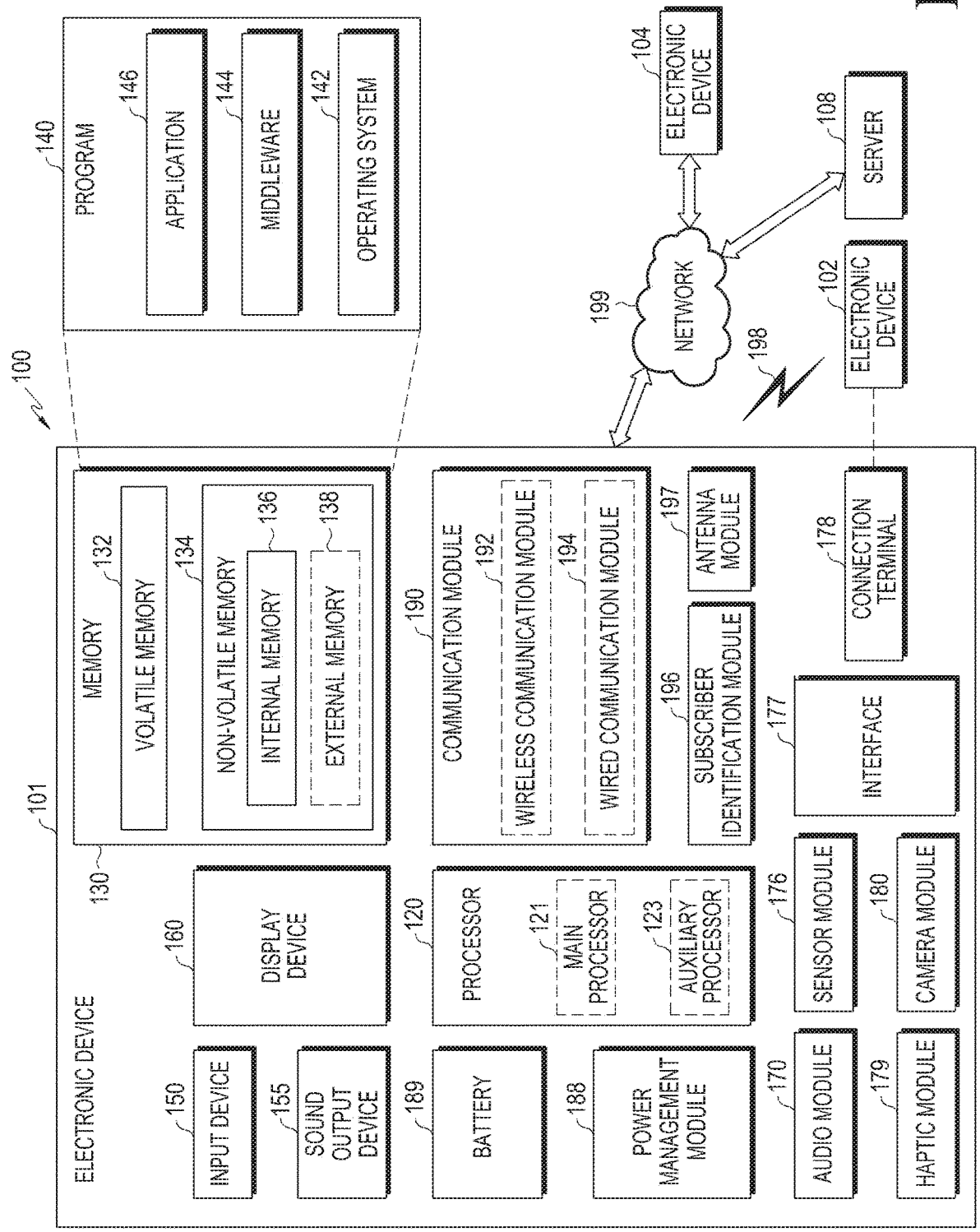
FIG. 1 is a view illustrating an electronic device in a network environment according to an embodiment of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, Wi-Fi direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may modify corresponding components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semi-permanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

Figure 2:
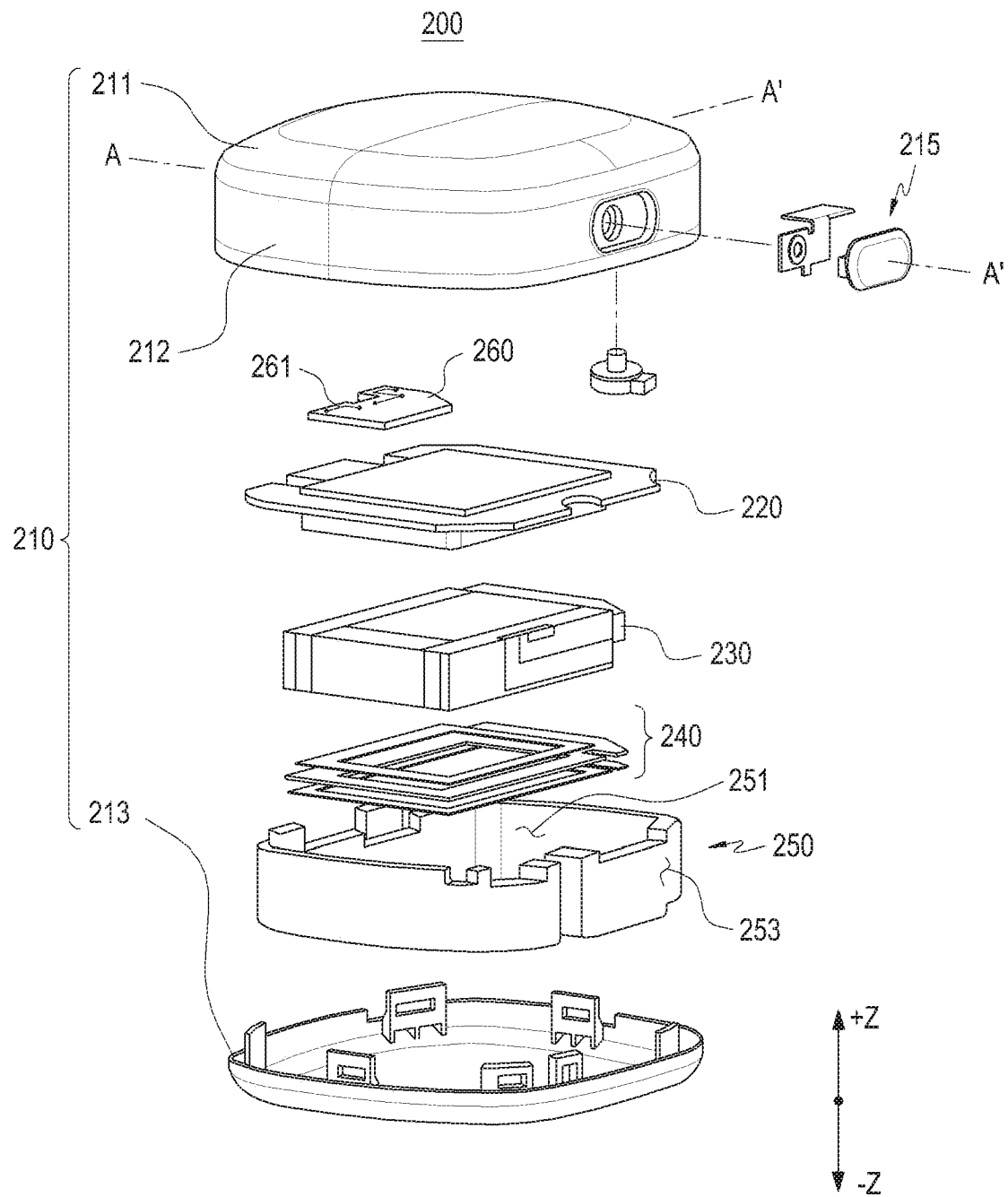
FIG. 2 is an exploded perspective view illustrating an electronic device 200 according to an embodiment of the disclosure.
Figure 3:
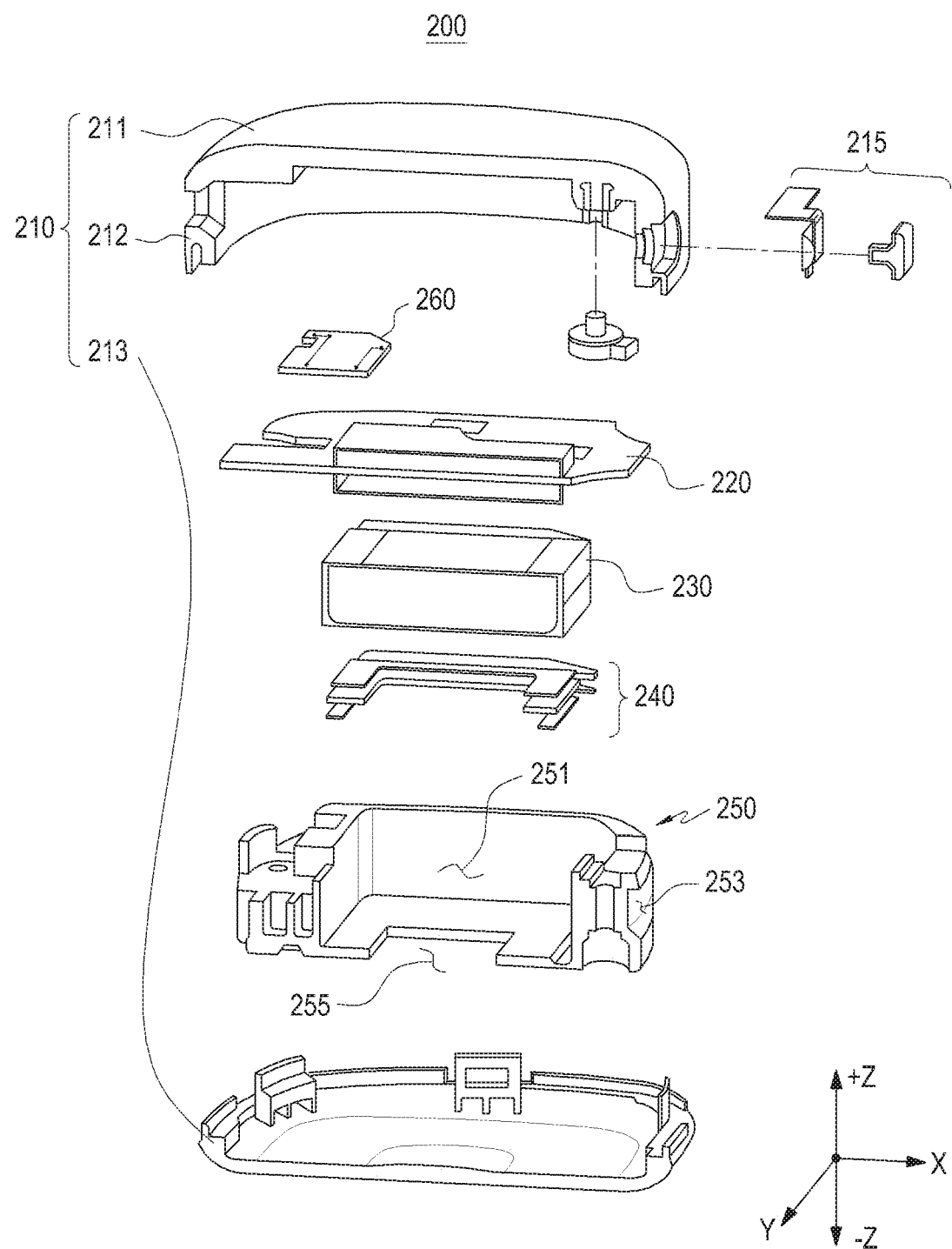
FIG. 3 is an exploded perspective, cross-sectional view of the electronic device of FIG. 2, taken along line A-A' according to an embodiment of the disclosure.

FIG. 2 is an exploded perspective view illustrating an electronic device 200 according to an embodiment of the disclosure. FIG. 3 is an exploded perspective, cross-sectional view of the electronic device of FIG. 2, taken along line A-A' according to an embodiment of the disclosure.

Referring to FIGS. 2 and 3, according to an embodiment, an electronic device 200 may include a housing 210, a printed circuit board 220, a battery 230, a bracket 250, and an elastic structure 240.

According to an embodiment, the housing 210 may include a first plate 211 facing forward (e.g., a first direction +Z), a second plate 213 facing backward (e.g., a second direction −Z), which is opposite to the first direction +Z, and a side member 212 disposed between the first plate 211 and the second plate 213.

As another example, the housing 210 may include an upper structure and a lower structure that may be coupled together, forming an internal space. The upper structure may include a plate (e.g., the first plate) facing in the first direction +Z and a side surface (e.g., the side member 212) extending from the plate. The lower structure may include a plate (e.g., the second plate 213) facing in the second direction −Z and a side surface extending from the plate.

According to an embodiment, the first plate 211 may form a front cover of the electronic device 200, and the second plate 213 may form a rear cover of the electronic device 200. The side member 212 may be configured to at least partially surround the space between the first plate 211 and the second plate 213.

According to an embodiment, the first plate 211 and the second plate 213 may be flat-shaped or may be structured to partially have at least one curve or to have at least one flexible shape. As another example, the outer surface of the side member 212 may be shaped to at least partially have a curve or a flexible shape. Accordingly, where the button structure 215 is placed on the front surface or side surface of the electronic device 200, it may be easily clicked by the user holding the electronic device 200.

According to an embodiment, the housing 210 may be provided to receive various electronic components. At least a portion (e.g., a portion of the first plate 211, the second plate 213, or the side member 212) of the housing 210 may be formed of a conductive material. For example, the side member 212 of the housing 210 may have a rectangular shape with four side surfaces, and at least a portion thereof, which is exposed to form the outer appearance of the electronic device 200, may be formed of a conductive material. At least a portion of the conductive material of the housing 210 (e.g., the side member 212) may be used as an antenna device, e.g., a radiating conductor. As another example, at least a portion of the housing 210 (e.g., the side member 212) may be insulated from another portion of the bracket 250 and may electrically be connected to the communication module, allowing it to be used as an antenna device.

According to an embodiment, the housing 210 may have the printed circuit board (PCB) 220 and/or the battery 230 received inside. For example, a processor (e.g., the processor 120 of FIG. 1), a communication module (e.g., the communication module 190 of FIG. 1), various interfaces (e.g., the interface 177 of FIG. 1), and a power management module (e.g., the power management module 188 of FIG. 1) may be mounted on the PCB 220 in the form of an integrated circuit (IC) chip. A control circuit may also be configured in an IC chip that may be mounted on the PCB 220. For example, the control circuit may be part of the processor or the communication module.

According to an embodiment, the bracket 250 may be mounted inside the housing 210. The bracket 250 may be formed of a metal and/or a non-metallic material (e.g., a polymer) and may be disposed between the first plate 211 and the second plate 213 of the housing 210.

According to an embodiment, the bracket 250 may reinforce the hardness of the electronic device 200. For example, the housing 210 may have several openings or recesses formed depending on the arrangement of the electronic parts inside the electronic device 200, deteriorating the hardness of the housing 210 or the electronic device 200. The bracket 250 may be mounted and fastened inside the electronic device 210, reinforcing the hardness of the housing 210 or the electronic device 200.

Although not shown in the drawings, according to an embodiment of the disclosure, various structures may be formed on the surface of the housing 210 and the bracket 250 depending on the arrangement of electronic parts inside the electronic device 200 or the structure in which the housing 210 and the bracket 250 are fastened together. For example, spaces for receiving IC chips mounted on the PCB 220 may be formed in the housing 210 and/or the bracket 250. The spaces for the IC chips may be formed in recessed shapes or ribs surrounding the IC chips. According to an embodiment, the housing 210 and the bracket 250 may have their corresponding fastening structures or fastening holes. For example, the housing 210 and the bracket 250 may be fastened together, with the bracket 250 facing or received in the housing 210 by fitting screws or other couplers to the fastening bosses or holes.

According to an embodiment, the bracket 250 may form a receiving space 251 for receiving the battery 230. The battery 230 resting in the receiving space 251 may be disposed in parallel with the PCB 220 without contacting the PCB 220. The battery 230 may electrically be connected with the printed circuit board 220. For example, the battery 230 may be seated in the receiving space 251 of the bracket 250. The side member 253 (e.g., an edge portion) of the bracket 250 may be configured to surround the side surface of the battery 230. The height of the side member 253 (e.g., the edge portion) of the bracket 250, e.g., the length of the side surface of the bracket along the Z axis, may be larger than the height of the battery 230, e.g., the length of the side surface of the battery along the Z axis. The first plate 211 and the PCB 220 may be joined together via, e.g., screws. The side member 253 of the bracket 250 may rest on the first plate 211 of the housing 210 and/or the PCB 220, and the PCB 220 and the battery 230 may be spaced apart from each other without contacting each other. As another example, the bracket 250 may have an opening 255 in the center of one surface thereof that faces the second plate 213. The opening 255 may be disposed so that the surface—facing in the second direction −Z—of the battery seated in the bracket 250 faces the inner surface of the second plate 213, preventing the battery from hitting the bottom of the bracket 250.

According to an embodiment, the battery 230 may be a device for supplying power to at least one component of the electronic device 200. The battery 189 may include, e.g., a primary cell which is not rechargeable, a secondary cell which is rechargeable, or a fuel cell. The battery 230 may be integrally or detachably disposed inside the electronic device 200.

According to an embodiment, a radiating structure 260 with a conductive pattern 261 may electrically be connected with the PCB 220 and may be mounted inside the housing 210. For example, the radiating structure 260 may be positioned between the first plate 211 and the bracket 250 or between the rear cover (e.g., second plate 213) and the bracket 250. The conductive pattern 261 may be an antenna that transmits or receives radio waves or produces magnetic fields. The radiating structure 260 may be configured to provide wireless communication over a low power wide area network (LPWAN). For example, the LPWAN may include a narrow-band internet-of-things (NBIOT) network.

According to an embodiment, the conductive pattern 261 may be a portion of the radiating structure 260 that is formed by laser direct structuring (LDS). As another example, the conductive pattern 261 may be a metallic portion that forms at least a portion (e.g., the side member 212) of the housing 210 of the electronic device.

According to an embodiment, radio waves transmitted or received through the conductive pattern 261 of the radiating structure 260 or magnetic fields produced by the conductive pattern 261 of the radiating structure 260 may be transmitted through the plate, e.g., the first plate 211 or the second plate 213.

According to an embodiment, the elastic structure 240 may be placed inside the bracket 250, elastically supporting the battery 230. The elastic structure 240 is positioned opposite the PCB 220 with respect to the battery 230, and both sides thereof may have adhesive members for attaching to the battery 230 and the bracket 250. The elastic structure 240 is described below in greater detail.

According to an embodiment, the second plate 213 may be disposed in the second direction −Z of the battery 230 and the PCB 220 while at least partially wrapping around the bracket 250. The second plate 213 along with the side member 212 and the first plate 211 may form the outer appearance of the electronic device 200. According to an embodiment, the second plate 213 may be detachably coupled with the bracket 250. The user may exchange storage media (e.g., subscriber identification module (SIM) cards or SD cards) or batteries 230 by removing the second plate 213. As another example, the second plate 213 may form a uni-body structure with the bracket 250, restricting the user from arbitrarily removing from the bracket 250.

Figure 4:
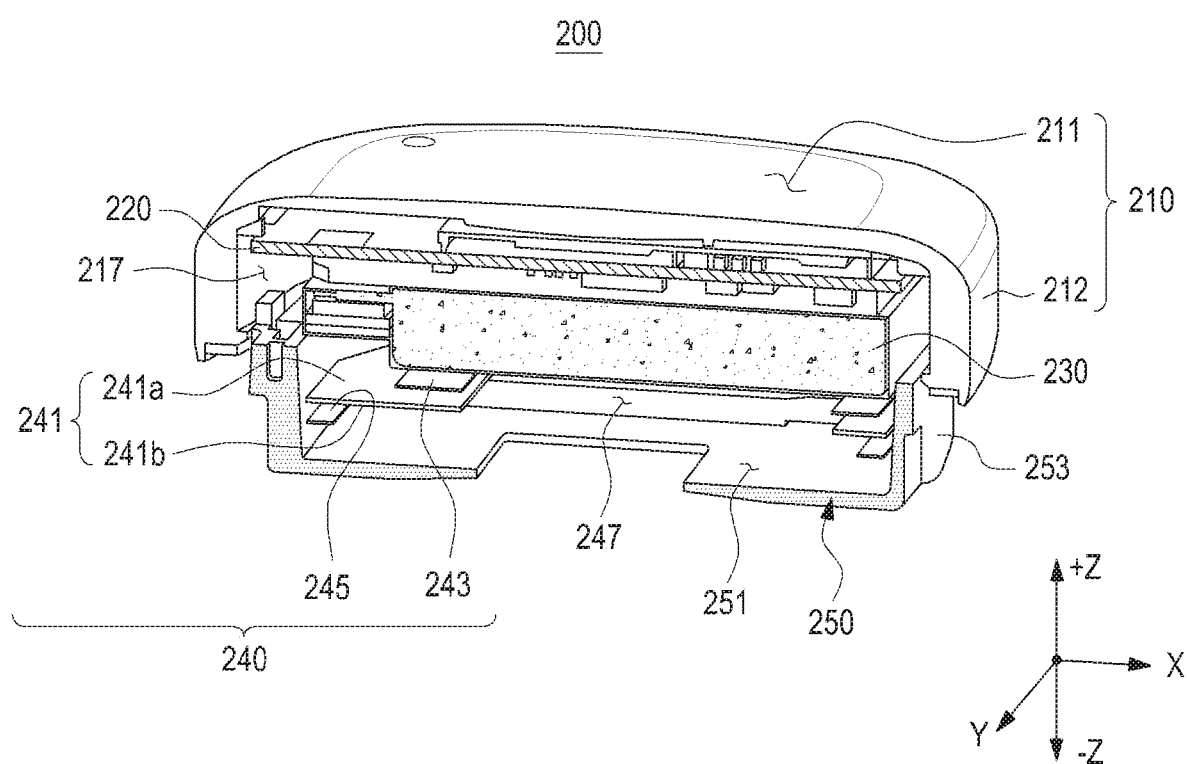
FIG. 4 is a cross-sectional view illustrating an arrangement of components of an electronic device 200 before assembled according to an embodiment of the disclosure.

FIG. 4 is a cross-sectional view illustrating an arrangement of components of an electronic device 200 before assembled according to an embodiment of the disclosure. The structure of the electronic device 200 shown in FIG. 4 may be the same in whole or part as the structure of the electronic device 200 of FIGS. 2 to 3.

Referring to FIG. 4, according to an embodiment, an electronic device 200 may include a housing 210, a printed circuit board 220, a battery 230, a bracket 250, and an elastic structure 240.

According to an embodiment, in the electronic device 200, the PCB 220 and the bracket 250 may be placed down (e.g., in the second direction −Z) in the internal space 217 that is formed by the housing 210. The bracket 250 may include a receiving space 251 that may support the housing 210 and may have electronic components placed therein. The battery 230 and the elastic structure 240 may be stacked down (e.g., in the second direction −Z) in the receiving space 251.

According to an embodiment, the PCB 220 may be disposed adjacent the first plate 211 of the housing 210. For example, the PCB 220 may be fastened to one surface of the first plate 211 via, e.g., screws.

According to an embodiment, the PCB 220 and the battery 230 may at least partially face each other while being spaced apart from each other at a predetermined interval. For example, a supporting member (e.g., the supporting member 321 of FIGS. 7 and 8) may be disposed between a portion of the battery 230 and the PCB 220, allowing the rest of the battery 230 to remain spaced apart from the PCB 220. As another example, although not shown in the drawings, a rib may be formed on the inner surface of the side member 212 of the housing 210 to project towards the internal space 217 or to surround the PCB 220, thereby supporting the PCB 220. As another example, the side member 253 (e.g., the edge portion) formed on the top of the bracket 250 to face in the first direction +Z may support a portion of the PCB 220, allowing the PCB 220 to be spaced apart from the battery 230 without contacting the battery 230. As another example, at least a portion of the side member of the battery 230 may be rested or supported on the first plate 211 of the housing and/or the PCB 220. Since the height of the side member 253 of the bracket 250, e.g., the length of the side surface of the bracket along the Z axis, is larger than the height of the battery 230, e.g., the length of the side surface of the battery along the Z axis, the PCB 220 and the battery 230 may be spaced apart from each other.

As the battery 230 feeds power, a portion (e.g., a central portion) thereof may be swollen, and the portion may advantageously be prevented from contacting the other electronic components in view of the stability of the electronic device 200. According to an embodiment, the PCB 220 placed on the battery 230 may be supported by the bracket 250 and/or the side member 212 of the housing 210, remaining a predetermined distance away from the battery 230 and hence placing the electronic device 200 in a more stable condition.

According to an embodiment, the elastic structure 240 may be mounted together with the battery 230 in the receiving space 251 of the bracket 250 and may be positioned facing the PCB 220 with respect to the battery 230. The elastic structure 240 may be configured so that only the edge portion of its surface facing in the second direction −Z of the battery 230 comes in contact while the rest does not. For example, the elastic structure 240, to be avoided from contacting the central portion of the battery 230, may be formed in a shape surrounding the edge portion of the battery 230, and the central portion may have the opening 247. In the central portion of the battery 230, the battery 230 and the bracket 250 may remain as far away as the thickness of the elastic structure 240, ensuring the stability of the electronic device 200.

According to an embodiment, the elastic structure 240 may include an elastic member 241 and at least one adhesive member 243 and 245.

According to an embodiment, the elastic member 241 may be shaped as a plate having an opening inside, protecting the battery 230 against external impacts. For example, the elastic member 241 may include a first surface 241a facing in the first direction +Z and a second surface 241b facing in the second direction −Z which is opposite to the first direction +Z and may include an elastic material. The elastic material may include at least one of, e.g., foam, sponge, or rubber. The first surface 241a may form a closed loop, e.g., a rectangular ring with a central opening, to surround only the edge portion of the battery 230, and the second surface 241b may face the bracket 250. However, the structure of the elastic member 241 is not limited to the rectangular ring or other such closed loops, but rather in other various shapes, e.g., any shape with a central opening, a line shape partially open, or a shape with multiple segments covering different parts of the edge portion.

According to an embodiment, the circumference of the elastic member 241 may be formed to be larger than the circumference of the battery 230 and may be sized to correspond to the receiving space 251 of the bracket 250. For example, the circumference of the elastic member 241 may be at least partially the same as the size of the receiving space 251, and thus, even when the battery 230 is designed to be substantially smaller than the receiving space 251, the battery 230 may be fastened to the elastic member 241 and may be suppressed from movement on a plane (e.g., the XY plane) in the receiving space 251 of the bracket 250.

According to an embodiment, when external impacts are applied to the electronic device 200, the elastic member 241 formed of an elastic material may disperse or mitigate the impacts to the battery 230, providing stability.

According to an embodiment, the adhesive members 243 and 245 may include a first adhesive member 243 disposed on the first surface 241a of the elastic member 241 and a second adhesive member 245 disposed on the second surface 241b of the elastic member 241. The first adhesive member 243 may attach the battery 230 to the first surface 241a of the elastic member 241, and the second adhesive member 245 may attach the elastic member 241 to the bracket 250. The first adhesive member 243 and the second adhesive member 245 may include an elastic material, and they along with the elastic member 241 may prevent external impacts to the battery 230.

According to an embodiment, the first adhesive member 243 and the second adhesive member 245 may be designed to correspond in shape to the elastic member 241. For example, the first adhesive member 243 and the second adhesive member 245 each may be shaped as a plate with an opening that allows the adhesive members to not overlap the central portion of the battery 230, forming a closed loop to surround the edge portion of the battery 230. However, the first adhesive member 243 and the second adhesive member 245 are not limited as having such shape, and they may be formed with a plurality of segments to cover different portions of the edge portion of the battery 230.

According to an embodiment, the first adhesive member 243 and the second adhesive member 245 may be formed in different sizes. For example, the circumference of the first adhesive member 243 may be smaller than the circumference of the second adhesive member 245. As another example, the circumference of the second adhesive member 245 may be smaller than the first adhesive member 243. Now described in detail is an elastic structure as per an arrangement of the first adhesive member 243 and the second adhesive member 245.

Figure 5:
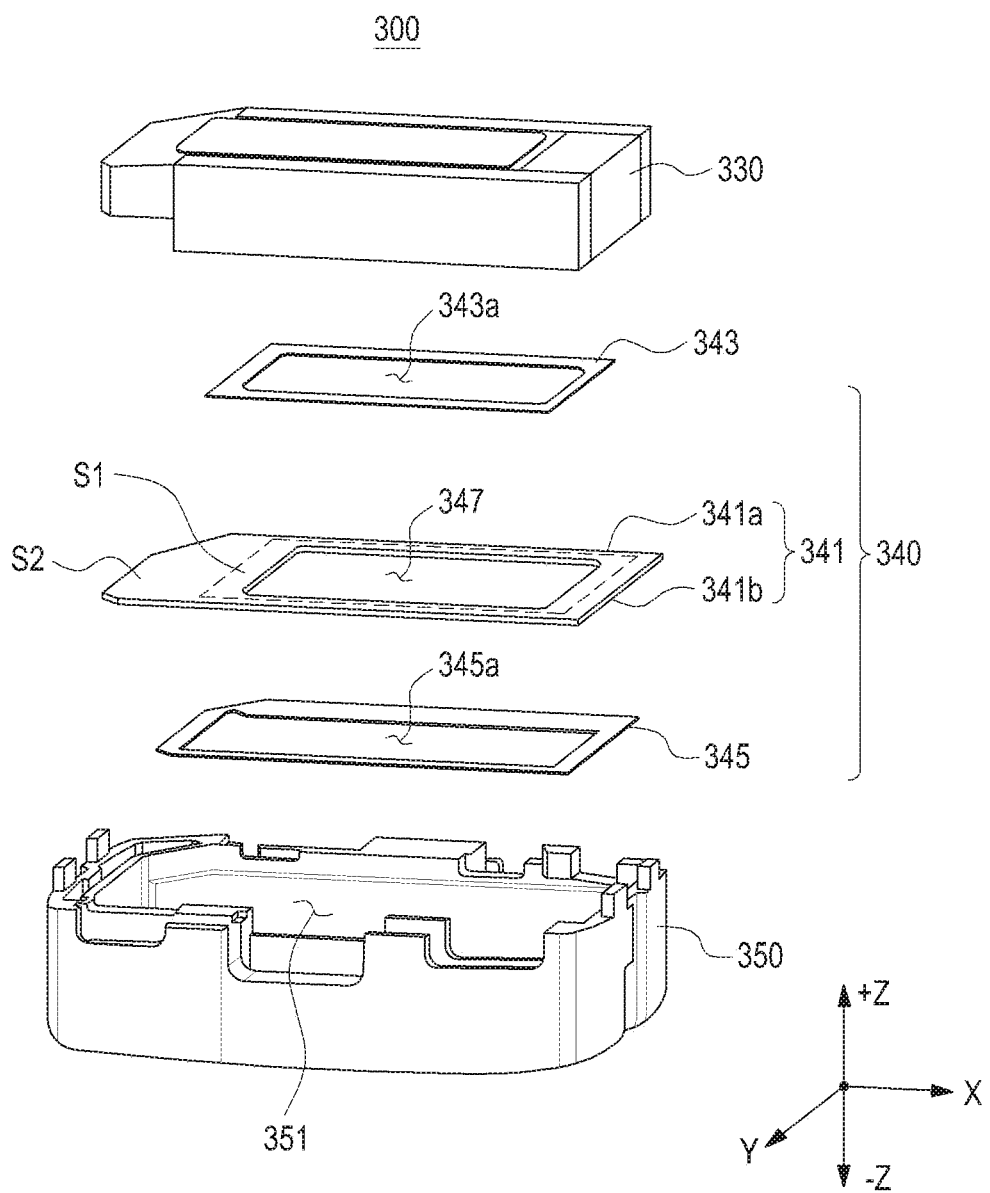
FIG. 5 is a perspective view illustrating an elastic structure 340 before placed on a bracket 350 according to an embodiment of the disclosure.
Figure 6A:
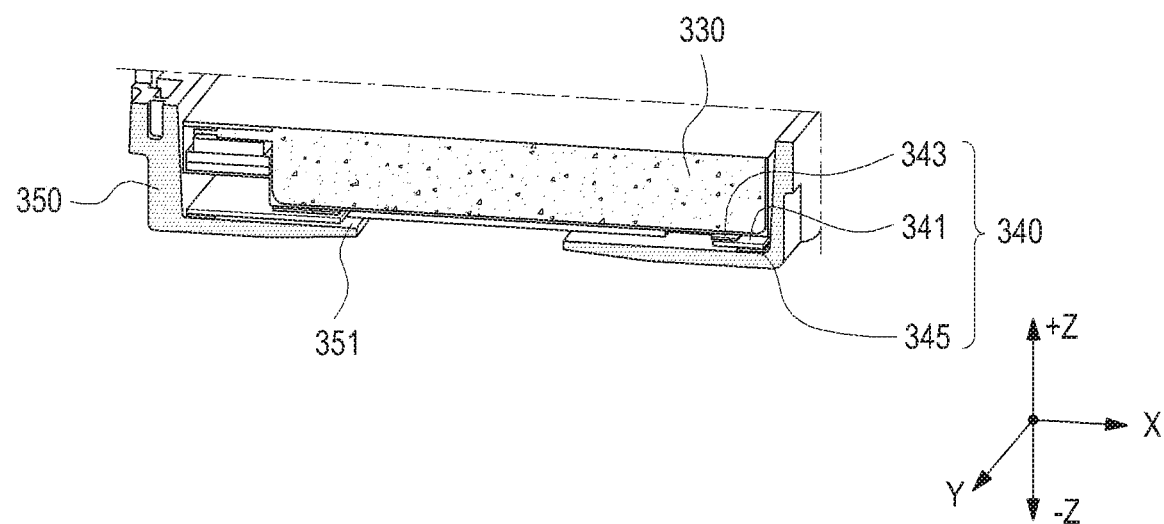
FIG. 6A is a cross-sectional view illustrating assembled components of the electronic device of FIG. 5 according to an embodiment of the disclosure.
Figure 6B:
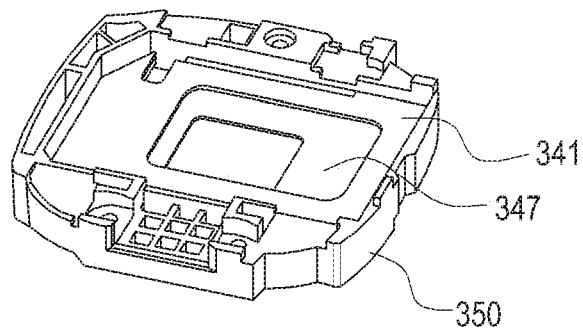
FIG. 6B is a top perspective view illustrating the bracket and the elastic structure, as assembled, of FIG. 6A according to an embodiment of the disclosure.

FIG. 5 is a perspective view illustrating an elastic structure 340 before placed on a bracket 350 according to an embodiment of the disclosure. FIG. 6A is a cross-sectional view illustrating assembled components of the electronic device of FIG. 5. FIG. 6B is a top perspective view illustrating the bracket and the elastic structure, as assembled, of FIG. 6A according to an embodiment of the disclosure.

Referring to FIGS. 5, 6A, and 6B, according to an embodiment, an electronic device 300 may include a battery 330, a bracket 350, and an elastic structure 340. The structure of the battery 330, the elastic structure 340, and the bracket 350 of FIGS. 5 to 6B may be the same in whole or part as the structure of the battery 230, the elastic structure 240, and the bracket 250 of the electronic device 200 of FIGS. 2 to 4.

According to an embodiment, the elastic structure 340 may include an elastic member 341 and at least one adhesive member 343 and 345.

According to an embodiment, the elastic member 341 may be shaped as a plate including an opening 347 and may include a first surface 341a facing in the first direction +Z and a second surface 341b facing in the second direction −Z which is opposite to the first direction +Z. The elastic member 341 may form a closed loop to surround the edge portion of the battery 330 and may be sized to correspond to the receiving space 351 of the bracket 350. The elastic member 341 may include a first area S1 formed to surround (wrap around) the opening 347 and a second area S2 formed to surround the edge portion.

According to an embodiment, the adhesive members 343 and 345 may include a first adhesive member 343 disposed on the first surface 341a of the elastic member 341 and a second adhesive member 345 disposed on the second surface 341b of the elastic member 341.

According to an embodiment, when viewing the electronic device in the second direction −Z, the first adhesive member 343 and the second adhesive member 345 may be disposed not to overlap each other on the plane (e.g., the XY plane). For example, the first adhesive member 343 may be disposed in the first area S1 of the elastic member 341, and the second adhesive member 345 may be disposed in the second area S2. The first adhesive member 343 and the second adhesive member 345 may be disposed to support the different areas of the elastic member 341, increasing the range in which the elastic member 341 may deform (refer to FIGS. 9 and 10). As another example, the first adhesive member 343 and the second adhesive member 345 each may be shaped to have a central opening corresponding to the shape of the elastic member 341. For example, the opening 343a of the first adhesive member 343 and the opening 345a of the second adhesive member 345 may be larger than the opening 347 of the elastic member 341 not to block at least a portion of the opening 347 of the elastic member 341.

However, embodiments of the disclosure are not limited thereto. For example, when viewing the electronic device in the second direction −Z, the first adhesive member 343 and the second adhesive member 345 may be disposed to partially overlap each other on the plane (e.g., the XY plane). For example, the first adhesive member 343 may be disposed in a portion of the first area S1 and the second area S2 of the elastic member 341, and the second adhesive member 345 may be disposed in a portion of the second area S2 and the first area S1. The first adhesive member 343 may be disposed in an area larger than the first area S1, enhancing the adhesivity with the battery 330. The second adhesive member 345 may be disposed in an area larger than the second area S2, enhancing the adhesivity with the bracket 350.

Figure 7:
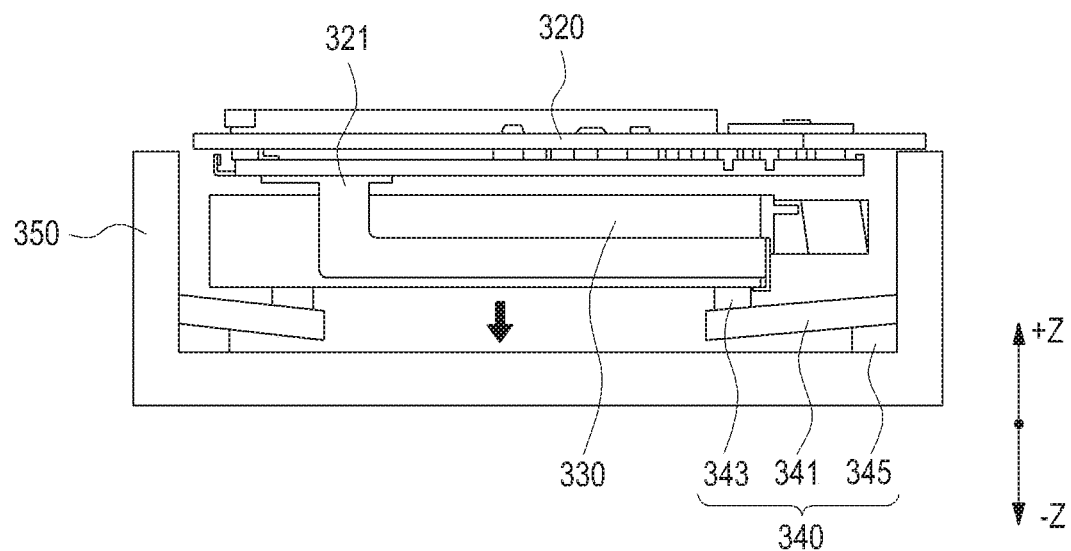
FIGS. 7 and 8 are views illustrating a deforming mechanism of an elastic structure 340 as shown in FIGS. 5 to 6B according to an embodiment of the disclosure.
Figure 8:
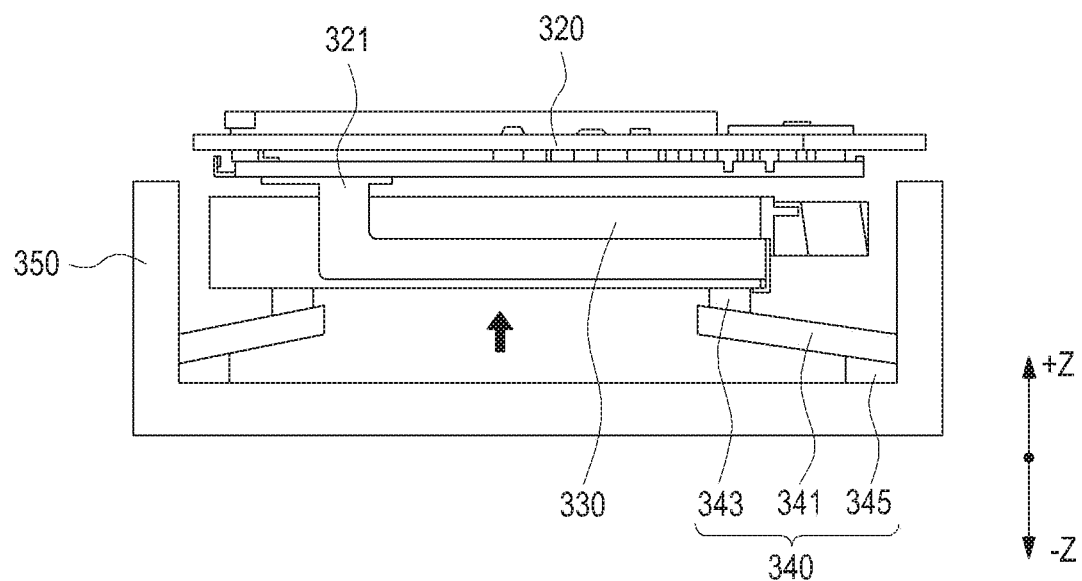

FIGS. 7 and 8 are cross-sectional views illustrating operations of the elastic structure 340 attached to the battery 330, according to an embodiment.

The structure of the battery 330, the elastic structure 340, and the bracket 350 of FIGS. 7 and 8 may be the same in whole or part as the structure of the battery 230 or 330, the elastic structure 240 or 340, and the bracket 250 or 350 of the electronic device 200 of FIGS. 2 to 6.

FIGS. 7 and 8 are views illustrating a deforming mechanism of the elastic structure 340 attached to the battery 330 according to various embodiments of the disclosure.

Referring to FIGS. 7 and 8, the first adhesive member 343 and the second adhesive member 345 may be disposed not to overlap each other. For example, the first adhesive member 343 may be disposed in a first area (e.g., the first area S1 of FIG. 5) of the elastic member 341, and the second adhesive member 345 may be disposed in a second area (e.g., the second area S2 of FIG. 5). As another example, the first adhesive member 343 may be disposed in the second area S2 of the elastic member 341, and the second adhesive member 345 may be disposed in the first area S1.

According to an embodiment, the assembly of the battery 330 and the elastic structure 340 in the bracket 350 may minimize the movement of the battery 330 when external impacts are applied thereto. According to an embodiment, the PCB 320 disposed on the battery 330 may remain spaced apart from the battery 330 at a predetermined distance. For example, the supporting member 321 may be disposed between a portion of the battery 330 and the PCB 320, allowing the rest of the battery 330 to remain spaced apart from the PCB 320. The supporting member 321 may be disposed in the edge portion of the battery 330, allowing the top center of the battery 330, which may deform, to remain spaced apart and preventing it from hitting the battery 330 that may move in the first direction +Z.

According to an embodiment, the elastic structure 340 disposed under the battery 330 may steadily space the battery 330 apart from the bracket 350 at a predetermined distance, preventing the battery 330 that may move in the second direction −Z from hitting the bottom of the bracket 350. An opening or hole may be formed in the bottom of the bracket 350, preventing the battery 330 from hitting the bottom of the bracket 350. As another example, the first adhesive member 343 may be disposed in the top, first area S1 of the elastic member 341, and the second adhesive member 345 may be disposed in the second area S2, increasing the range in which the elastic member 341 may deform. The increased range of the deformation or damping of the elastic member 341 may sequentially mitigate external impacts to the battery 330. As another example, the stacked structure of the elastic structure 340 may disperse external impacts.

According to an embodiment, the placement of the elastic structure 340 in the bracket 350 of the elastic member 341 may reduce the gap between the battery 330 and the receiving space 351 of the bracket 350, suppressing movement on the plane. Accordingly, the horizontal movement may be restricted, protecting the battery.

Figure 9:
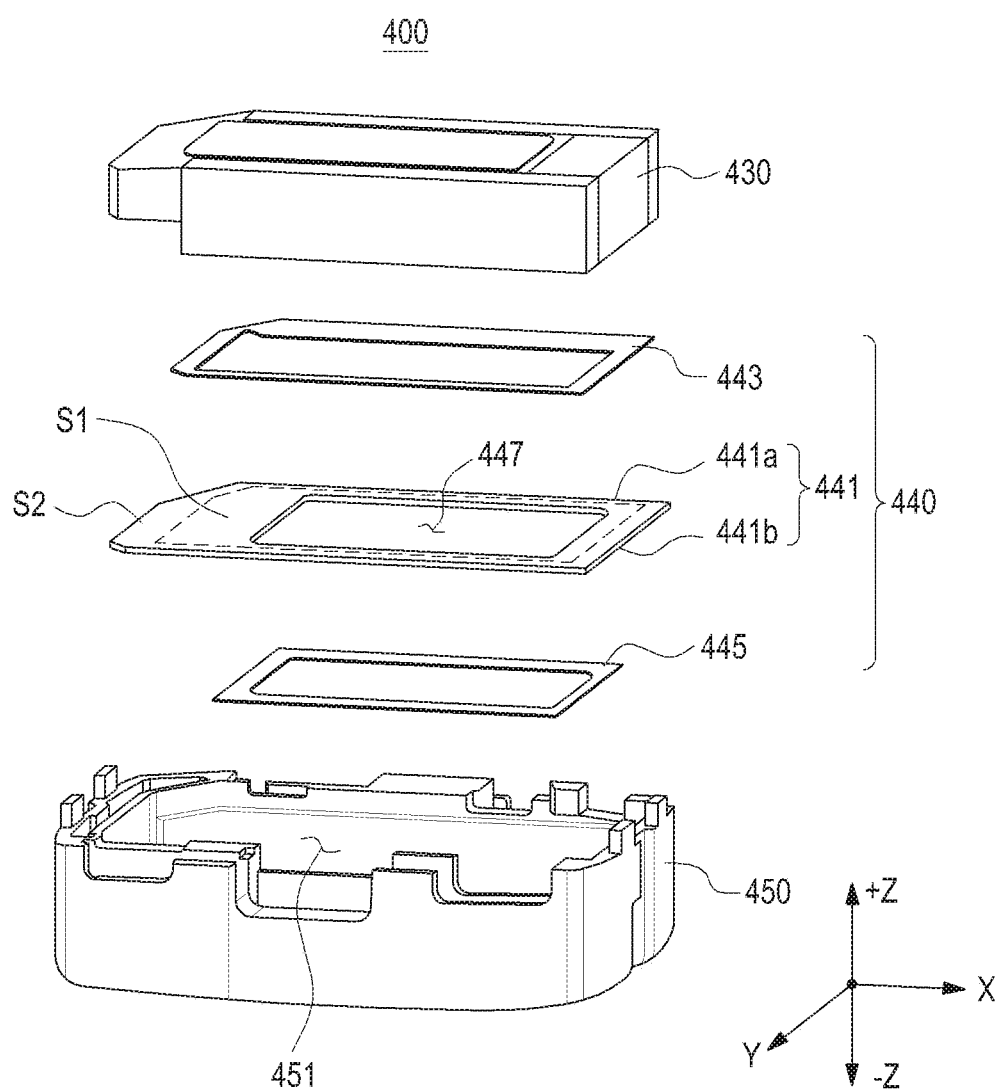
FIG. 9 is a perspective view illustrating an elastic structure 440 placed on a bracket 450 according to an embodiment of the disclosure.
Figure 10:
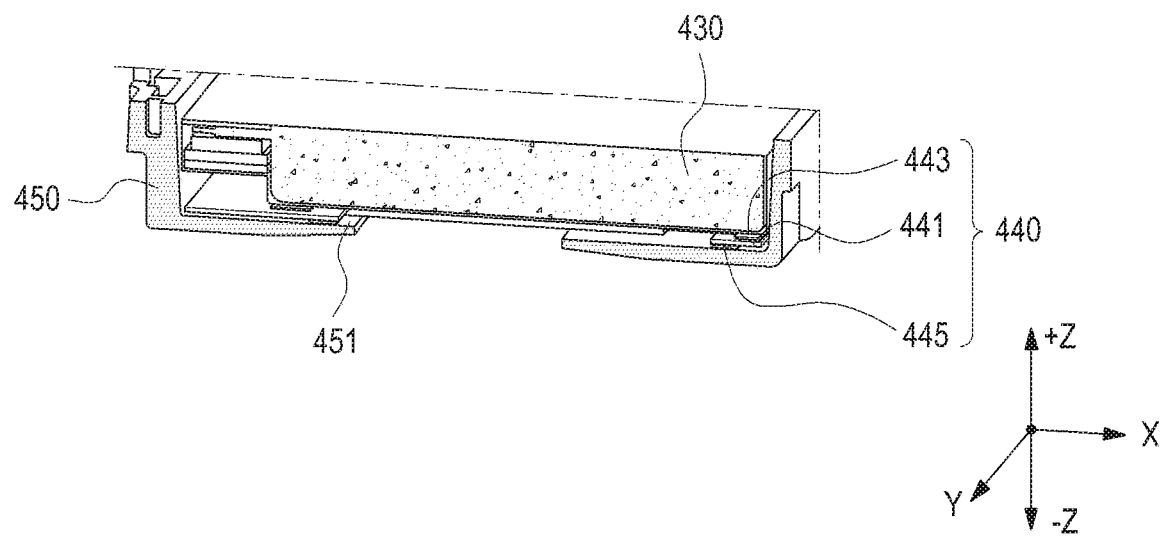
FIG. 10 is a cross-sectional view illustrating assembled components of the electronic device of FIG. 9, according to an embodiment of the disclosure.

FIG. 9 is a cross-sectional, perspective view illustrating an elastic structure 440 placed on a bracket 450 according to an embodiment. FIG. 10 is a cross-sectional view illustrating assembled components of the electronic device of FIG. 9, according to an embodiment of the disclosure.

Referring to FIGS. 9 and 10, according to an embodiment, an electronic device 400 may include a battery 430, a bracket 450, and an elastic structure 440. The structure of the battery 430, the elastic structure 440, and the bracket 450 of the electronic device 400 FIGS. 9 and 10 may be the same in whole or part as the structure of the battery 230, the elastic structure 240, and the bracket 250 of the electronic device 200 of FIGS. 2 to 4.

According to an embodiment, the elastic structure 440 may include an elastic member 441 and at least one adhesive member 443 and 445. According to an embodiment, the elastic member 441 may be shaped as a plate including an opening 447 and may include a first surface 441a facing in the first direction +Z and a second surface 441b facing in the second direction −Z which is opposite to the first direction +Z. The elastic member 441 may form a closed loop to surround the edge portion of the battery 430 and may be sized to correspond to the receiving space 451 of the bracket 450. The elastic member 441 may include a first area S1 formed to surround (wrap around) the opening 447 and a second area S2 formed to surround the edge portion.

According to an embodiment, the adhesive members 443 and 445 may include a first adhesive member 443 disposed on the first surface 441a of the elastic member 441 and a second adhesive member 445 disposed on the second surface 441b of the elastic member 441. According to an embodiment, when viewing the electronic device in the second direction −Z, the first adhesive member 443 and the second adhesive member 445 may be disposed not to overlap each other on the plane (e.g., the XY plane). For example, the first adhesive member 443 may be disposed in the second area S2 of the elastic member 441, and the second adhesive member 445 may be disposed in the first area S1. The first adhesive member 443 and the second adhesive member 445 may be disposed to support the different areas of the elastic member 441, increasing the range in which the elastic member 441 may deform.

However, embodiments of the disclosure are not limited thereto. For example, when viewing the electronic device in the second direction −Z, the first adhesive member 443 and the second adhesive member 445 may be disposed to partially overlap each other on the plane (e.g., the XY plane). For example, the first adhesive member 443 may be disposed in a portion of the second area S2 and the first area S1 of the elastic member 441, and the second adhesive member 445 may be disposed in a portion of the first area S1 and the second area S2. The first adhesive member 443 may be disposed in an area larger than the second area S1, enhancing the adhesivity with the battery 430. The second adhesive member 445 may be disposed in an area larger than the first area S1, enhancing the adhesivity with the bracket 450.

Figure 11:
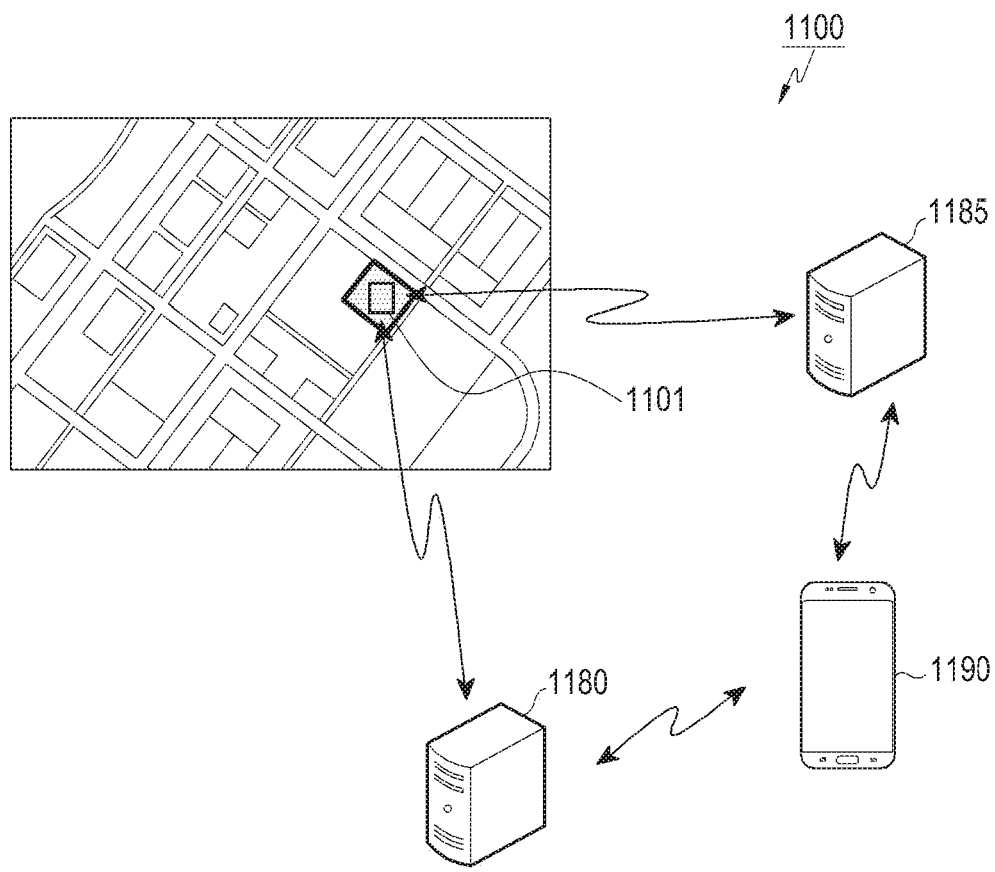
FIG. 11 is a block diagram schematically illustrating an electronic system according to an embodiment of the disclosure.

FIG. 11 is a block diagram schematically illustrating an electronic system according to an embodiment of the disclosure.

Referring to FIG. 11, an electronic system 1100 may include a first electronic device 1101, a first server 1180, a second server 1185, and a second electronic device 1190.

According to an embodiment, the electronic system 1100 may include the first electronic device 1101 that transmits location information indicating the location of the first electronic device 1101 to the second server 1185, the first server 1180 that stores information about the first electronic device 1101 (e.g., firmware data, data for indoor positioning, data for outdoor positioning, and/or software data), the second server 1185 that transmits the location information to the second electronic device 1190, and the second electronic device 1190 that identifies the location of the first electronic device 1101 via the second server 1185.

The first electronic device 1101 may download data from the first server 1180. The first electronic device 1101 may upload data to the first server 1180. For example, the first electronic device 1101 may be implemented to be substantially the same or similar to the electronic device 101 of FIG. 1 and the electronic device 200 of FIG. 2.

According to an embodiment, the first electronic device 1101 may download data (e.g., firmware data, software data, data for indoor positioning, and/or data for outdoor positioning) stored in the first server 1180. The first electronic device 1101 may upload data, not stored in the first server 1180, e.g., data for indoor positioning and/or data for outdoor positioning, to the first server 1180.

According to an embodiment, the first electronic device 1101 may obtain location information indicating the location of the first electronic device 1101 and transmit the obtained location information to the second server 1185.

According to an embodiment, the first electronic device 1101 may be implemented as a positioning tracker. For example, the first electronic device 1101 may take advantage of low-power wide area (LPWA). Alternatively, the first electronic device 1101 may be implemented as a narrow band-internet of things (NB-IOT) device.

According to an embodiment, the first electronic device 1101 may transmit location information indicating the current location of the first electronic device 1101 in response to a request from the second server 1185. The first electronic device 1101 may transmit the location information indicating the current location of the first electronic device 1101 at designated cycles.

Although the first electronic device 1101 transmits location information to the second server 1185 in the illustrated configuration, for ease of description, the technical spirit of the disclosure is not limited thereto. For example, the first electronic device 1101 may information, which the first electronic device 1101 obtains, to the second server 1185. For example, the first electronic device 1101 may transmit the obtained information, environment information (e.g., humidity, temperature, or dust information), and/or internal information about the first electronic device 1101 (e.g., battery identifier information) to the second server 1185.

According to an embodiment, the first electronic device 1101 may transmit or receive data to/from the first server 1180 through a plurality of communication channels. The first electronic device 1101 may transmit or receive data packets, each of which corresponds to a respective one of the plurality of communication channels, to/from the first server 1180. For example, the first electronic device 1101 may transmit or receive data to/from the first server 1180 via LPWA and common wireless communication (e.g., Wi-Fi or long term evolution (LTE)) and may transmit or receive data packets, each of which corresponds to a respective one of LPWA and the common wireless communication, to/from the first server 1180.

According to an embodiment, the first electronic device 1101 may transmit or receive data to/from the second server 1185 via LPWA. For example, the first electronic device 1101 may receive a request for current location information about the first electronic device 1101 from the second server 1185 via LPWA. The first electronic device 1101 may transmit the location information about its current location to the second server 1185 via LPWA.

The first server 1180 may store data for the first electronic device 1101, e.g., firmware data, software data, data for indoor positioning, and/or data for outdoor positioning.

The first server 1180 may transmit the data to the first electronic device 1101 as per a request from the first electronic device 1101 or the second electronic device 1190. The first server 1180 may receive, from the first electronic device 1101, data not stored in the first server 1180, such as data for indoor positioning data and/or data for outdoor positioning. For example, the first server 1180 may be implemented to be substantially the same or similar to the server 108 of FIG. 1.

The second server 1185 may manage the location information about the first electronic device 1101.

The second server 1185 may receive the location information from the first electronic device 1101. The second server 1185 may transmit the location information about the first electronic device 1101 to the second electronic device 1190 as per a request from the second electronic device 1190. The second server 1185 may store the location information received from the first electronic device 1101. The second server 1185 may be implemented to be substantially the same or similar to the server 108 of FIG. 1.

The first server 1180 and the second server 1185 may convert the format of the data received via LPWA into the format of data corresponding to common wireless communication by use of their respective converters (not shown). For example, the first server 1180 and the second server 1185 may convert the internet protocol (IP) address of the data received via LPWA into the IP address corresponding to the common wireless communication. For example, each of the first server 1180 and the second server 1185 may convert constrained application protocol (COAP) data received from the first electronic device 1101 into hypertext transfer protocol (HTTP) data using its converter (not shown).

Although FIG. 11 illustrates that the first server 1180 and the second server 1185 are separate servers, the technical spirit of the disclosure is not limited thereto, and the first server 1180 and the second server 1185 may rather be implemented as a single server.

The second electronic device 1190 may receive the location information indicating the location of the first electronic device 1101 via the second server 1185. The second electronic device 1190 may be implemented to be substantially the same or similar to the electronic device 101 of FIG. 1. For example, the second electronic device 1190 may be implemented as a terminal capable of identifying the location of the first electronic device 1101.

When the second electronic device 1190 sends a request for the location of the first electronic device 1101 to the second server 1185, the second electronic device 1190 may receive the location information from the second server 1185 and may identify the location of the first electronic device 1101 based on the received location information.

For ease of description below, the first electronic device 1101 and the first server 1180 are termed the electronic device 1101 and the server 1180, respectively.

Figure 12:
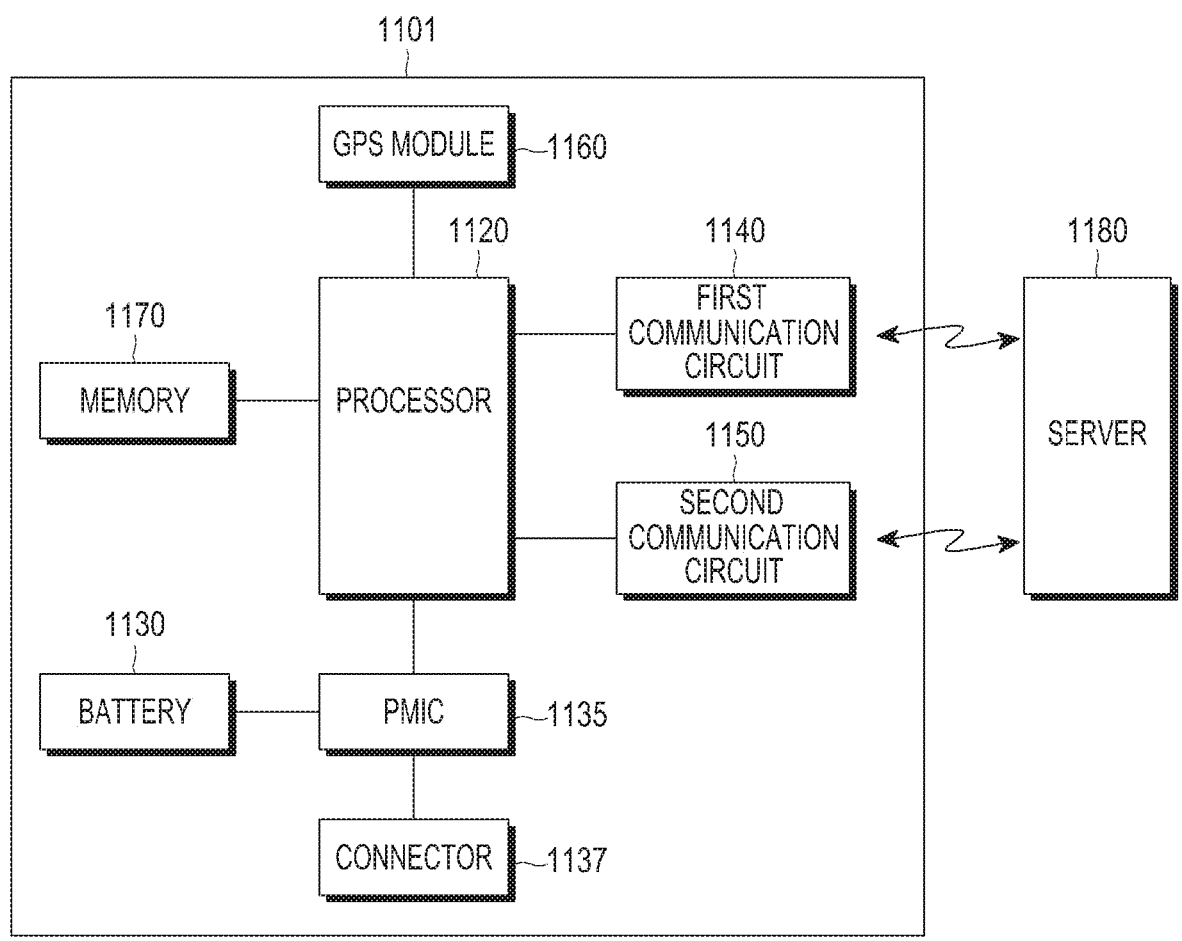
FIG. 12 is a block diagram illustrating an electronic device according to an embodiment of the disclosure.

FIG. 12 is a block diagram illustrating an electronic device according to an embodiment of the disclosure.

Referring to FIG. 12, the electronic device 1101 may include a processor 1120, a battery 1130, a PMIC 1135, a connector 1137, a first communication circuit 1140, a second communication circuit 1150, a global positioning system (GPS) module 1160, and a memory 1170.

The electronic device 1101 may be implemented to be substantially the same or similar to the electronic devices 101 and 1101 described above in connection with FIGS. 1 and 11.

The electronic device 1101 may include a plurality of communication circuits capable of transmitting or receiving data via a plurality of communication channels. The electronic device 1101 may include a housing. For example, the housing may form the whole or part of the outer surface of the electronic device 1101.

According to an embodiment, the electronic device 1101 may include a first communication circuit 1140 and a second communication circuit 1150. For example, the first communication circuit 1140 may provide first wireless communication using a LPWA network. The second communication circuit 1150 may provide second wireless communication using Wi-Fi or LTE.

Although FIG. 12 illustrates that the electronic device 1101 includes two communication circuits 1140 and 1150 for ease of description, the number and/or type of communication circuits included in the electronic device 1101 is not limited thereto.

The processor 1120 may control the overall operation of the electronic device 1101. According to an embodiment, the processor 1120 may control the first communication circuit 1140 and/or the second communication circuit 1150 to transmit or receive data to/from the first server 1180 and/or the second server 1185 via the first wireless communication and/or the second wireless communication.

According to an embodiment, the processor 1120 may transmit location information about the electronic device 1101 to the second server 1185 via the first communication circuit 1140. For example, the location information may mean information indicating the location of the electronic device 1101, e.g., GPS information and/or access point (AP) information. The processor 1120 may receive information about a request for the location of the electronic device 1101 from the second server 1185 via the first communication circuit 1140. In response to the request information from the second server 1185, the processor 1120 may transmit the location information indicating the location of the electronic device 1101 to the second server 1185 via the second communication circuit 1150.

According to an embodiment, the processor 1120 may receive a request for updating the electronic device 1101 from the server 1180 via the first communication circuit 1140.

According to an embodiment, the processor 1120 may measure the location of the electronic device 1101 using the second communication circuit 1150. The processor 1120 may perform Wi-Fi-based positioning using the second communication circuit 1150. For example, the processor 1120 may measure the location of the electronic device 1101 based on signals (or their strength) received from at least one AP (or coordinates corresponding to the AP) around the electronic device 1101. Where the second communication circuit 1150 is capable of LTE communication, the processor 1120 may measure the location of the electronic device 1101 based on signals (or their strength) received from at least one base station (or coordinates corresponding to the base station) around the electronic device 1101.

The processor 1120 may activate the first communication circuit 1140 as default.

The processor 1120 may do the activation only when performing positioning or communicating with the server 1180 to download or upload data. For example, the processor 1120 may leave the second communication circuit 1150 inactive as default. For example, when the second communication circuit 1150 is inactive, the processor 1120 may supply a first amount of power to the second communication circuit 1150 to activate the second communication circuit 1150, and to maintain the activation, the processor 1120 may supply a second amount of power to the second communication circuit 1150. In this case, the first amount of power may be smaller than the second amount of power.

Now assumed for ease of description is that the second communication circuit 1150 is a communication circuit performing Wi-Fi communication. However, the technical spirit of the disclosure is not limited thereto.

The processor 1120 may receive a GPS signal from the GPS module 1160. The processor 1120 may measure the location of the electronic device 1101 based on the GPS signal.

According to an embodiment, the processor 1120 may measure the location of the electronic device 1101 based on the earlier received one of the GPS signal and the Wi-Fi signal. For example, the processor 1120 may measure the location of the electronic device 1101 based on the GPS signal outdoors and may measure the location of the electronic device 1101 based on the Wi-Fi signal indoors.

The processor 1120 may store information about at least one AP around the electronic device 1101 (e.g., coordinates of the AP) in the memory 1170. The processor 1120 may update the information about the at least one AP around the electronic device 1101.

The processor 1120 may update the electronic device 1101. For example, the processor 1120 may download first data for updating from the server 1180 and perform the update. For example, updating the electronic device 1101 may include security updates for the whole or part of the electronic device 1101, firmware updates, and/or updates to data for indoor positioning (e.g., GPS satellite information), and/or updates to data for indoor positioning (e.g., the Wi-Fi AP list (Wi-Fi tiles)). The first data may mean data needed to update the electronic device 1101.

According to an embodiment, the processor 1120 may perform update at designated cycles. For example, the data for indoor positioning (e.g., GPS satellite information) may be updated every seven days. The data for indoor positioning (e.g., the Wi-Fi AP list) may be updated every month.

According to an embodiment, the processor 1120 may perform update as per a request from the user or the server 1180. For example, the processor 1120 may receive a request for updating the electronic device 1101 via the first communication circuit 1140.

According to an embodiment, when there is a request for updating the electronic device 1101, the processor 1120 may determine whether to update based on the attributes of the first data and the power of the battery 1130. For example, updating the electronic device 1101 may be requested at designated cycles. Updating the electronic device 1101 may be requested by the server 1180.

When there is a request for updating the electronic device 1101, the processor 1120 may determine the attributes of the first data for updating. For example, the attributes of the first data may be contained in the update request. For example, the attributes of the first data may include name, size, type, and/or importance.

According to an embodiment, the processor 1120 may upload second data stored in the electronic device 1101 to the server 1180.

According to an embodiment, the processor 1120 may perform upload at designated cycles. The processor 1120 may perform upload as per a request from the user or the server 1180. For example, the processor 1120 may receive a request for updating the electronic device 1101 via the first communication circuit 1140.

For example, when there is a request for uploading the second data stored in the electronic device 1101, the processor 1120 may determine whether to upload based on the attributes of the second data for upload and the power of the battery 1130. For example, the second data may mean data for upload. For example, the second data may mean data for a database or a Wi-Fi AP list not registered in the server 1180 among databases or Wi-Fi AP lists for indoor positioning. For example, the second data may include the Wi-Fi AP medium access control (mac) address of the Wi-Fi AP not registered in the server, the RSSI of the signal received from the Wi-Fi AP, and the location of the GPS that has performed positioning based on the Wi-Fi AP.

When there is a request for upload of the electronic device 1101, the processor 1120 may determine the attributes of the second data for upload. For example, the attributes of the second data may be contained in the upload request. For example, the attributes of the second data may include name, size, type, and/or importance.

The processor 1120 may determine the power of the battery 1130 via the power management circuit 1135. For example, the processor 1120 may determine whether the power of the battery 1130 is enough to perform update or upload according to the attributes of the first data. The processor 1120 may also determine whether the battery 1130 is supplied enough power to perform update or upload from the outside (or an external charger) according to the attributes of the first data or the second data.

According to an embodiment, when the power of the battery 1130 is sufficient to perform update, the processor 1120 may download the first data from the server 1180 to perform update. Conversely, unless the power of the battery 1130 is sufficient to perform update, the processor 1120 may not perform update.

According to an embodiment, when the power of the battery 1130 is enough to perform upload, the processor 1120 may upload the second data to the server 1180. In contrast, unless the power of the battery 1130 is sufficient to perform upload, the processor 1120 may not perform upload.

According to an embodiment, the processor 1120 may determine (or select) a communication circuit to download the first data between the first communication circuit 1140 and the second communication circuit 1150. For example, the processor 1120 may determine the communication circuit to download the first data between the first communication circuit 1140 and the second communication circuit 1150 as per the attributes of the first data.

According to an embodiment, the processor 1120 may determine (or select) the communication circuit to upload the second data between the first communication circuit 1140 and the second communication circuit 1150 as per the attributes of the second data uploaded.

The battery 1130 may store power. For example, the battery 1130 may store the power supplied from an external charger (or an external power source).

The connector 1137 may be connected to the external charger (or the external power source). For example, the connector 1137 may wiredly or wirelessly be connected with the external charger (or the external power source).

The power management circuit 1135 may manage the power of the electronic device 1101. For example, the power management circuit 1135 may identify the amount of power of the battery, the charged state of the battery, and/or the amount of power charged and supplied. For example, the power management circuit 1135 may manage the power stored in the battery 1130. The power management circuit 1135 may manage the power supplied from the external charger.

Although FIG. 12 illustrates that the power management circuit 1135 and the processor 1120 are separate components, the power management circuit 1135 may be included in the processor 1120. In other words, the processor 1120 may perform the functions of the power management circuit 1135.

The GPS module 1160 may receive GPS signals. For example, a GPS signal may contain information about the location of the electronic device 1101. The GPS module 1160 may be included in the first communication circuit 1140.

The GPS module 1160 is not limited to a GPS module and may rather be implemented as a GNSS communication module (or an example of the GNSS communication module) as described above in connection with FIG. 1.

The memory 1170 may store data for operations of the electronic device 1101. For example, the memory 1170 may store data for outdoor positioning of the electronic device 1101 (e.g., GPS satellite information) and data for indoor positioning (e.g., the Wi-Fi AP list (or Wi-Fi tiles)).

The memory 1170 may store first data (e.g., update data) downloaded from the server 1180. The memory 1170 may store second data (e.g., information about the Wi-Fi AP not stored in the Wi-Fi AP list) to be uploaded to the server.

Although FIG. 12 illustrates that the processor 1120 and the memory 1170 are separate components, the processor 1120 and the memory 1170 may be implemented as a single control circuit electrically connected.

Figure 13:
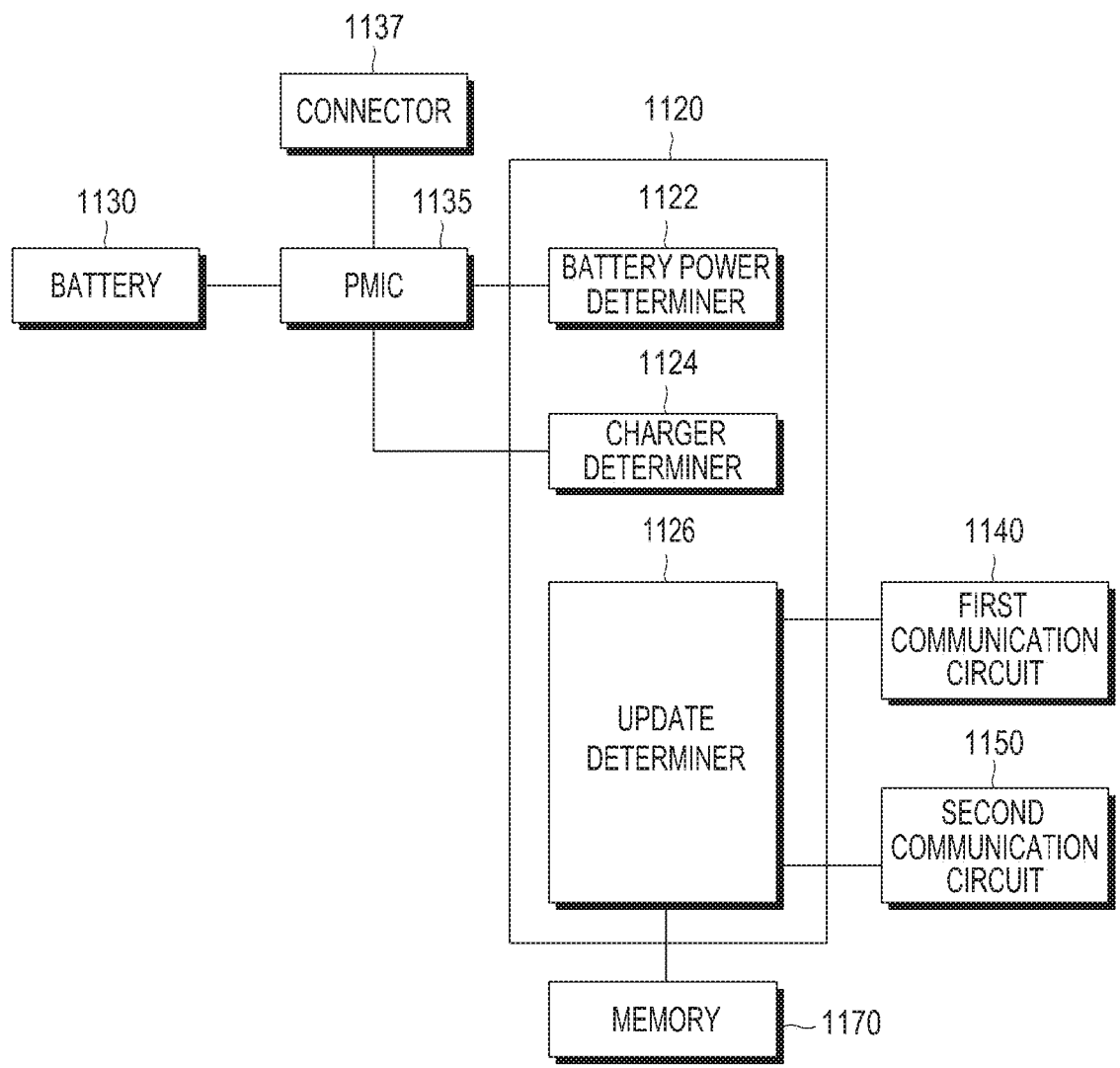
FIG. 13 is a block diagram illustrating operations of a processor according to an embodiment of the disclosure.

FIG. 13 is a block diagram illustrating operations of a processor according to an embodiment.

Referring to FIG. 13, the processor 1120 may include a battery power determiner 1122, a charger determiner 1124, and an update determiner 1126. For example, the battery power determiner 1122, the charger determiner 1124, and the update determiner 1126 may be in the form of temporarily loading instructions or may mean operations of the processor 1120.

The battery power determiner 1122 may determine the power of the battery 1130 via the power management circuit 1135. For example, the battery power determiner 1122 may determine the amount of power stored in the battery 1130. The battery power determiner 1122 may determine the amount of power of the battery 1130 consumed by performing update or upload.

The charger determiner 1124 may determine the charging capacity of a charger connected to the connector 1137. For example, the charger determiner 1124 may determine the charging capacity of the charger based on the magnitude of the voltage applied to the connector 1137. For example, when the voltage applied to the connector 1137 is 9V, the charger determiner 1124 may determine that the charge has a high charging capacity (e.g., capable of quick charging), and when the voltage applied to the connector 1137 is 5V, the charger determiner 1124 may determine that the charging capacity of the charge is not high (e.g., capable of normal charging). The charger determiner 1124 may determine the charging time of the battery 1130 based on the charging capacity of the charger.

The update determiner 1126 may determine whether to perform update (or upload). For example, the update determiner 1126 may determine whether to perform update (or upload) based on the results of the determination by the battery power determiner 1122 and the charger determiner 1124. For example, the update determiner 1126 may determine to perform update when the power of the battery 1130 is enough to perform update given the charging capacity of the charger and the power of the battery 1130. According to an embodiment, the update determiner 1126 may determine to hold on updating unless the power of the battery 1130 is enough to perform update given the charging capacity of the charger and the power of the battery 1130.

The update determiner 1126 may determine whether to perform update based on the attributes of the first data for updating. For example, when the importance of the first data is very high, the update determiner 1126 may determine to update regardless of the power of the battery 1130.

For example, when the size of the first data is large, more power may be consumed for update, and, thus, the update determiner 1126 may set the amount of power necessary for update to be high. When the size of the first data is small, less power may be consumed for update, and, thus, the update determiner 1126 may set the amount of power necessary for update to be low.

The update determiner 1126 may determine a communication circuit to download the first data for update between the first communication circuit 1140 and the second communication circuit 1150 based on the attributes of the first data. The update determiner 1126 may determine the communication circuit to download the first data between the first communication circuit 1140 and the second communication circuit 1150 based on the size and/or importance of the first data.

According to an embodiment, the update determiner 1126 may determine a communication circuit to upload the second data between the first communication circuit 1140 and the second communication circuit 1150 based on the attributes of the second data.

Figure 14A:
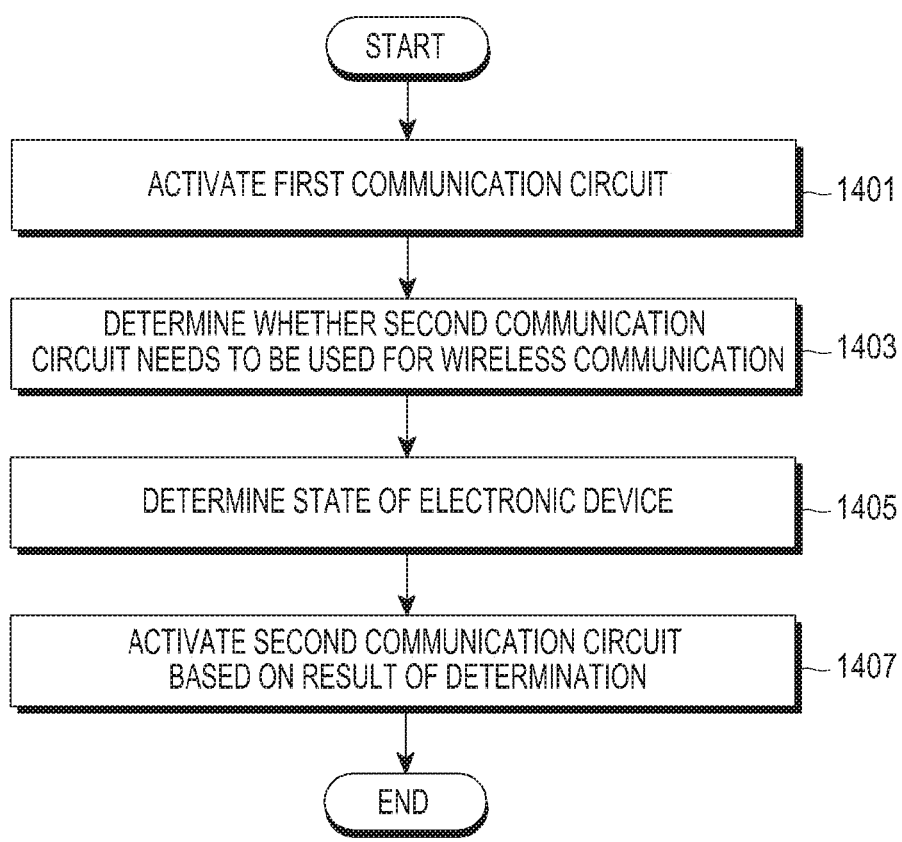
FIGS. 14A and 14B are flowcharts illustrating operations of an electronic device according to an embodiment of the disclosure.

FIG. 14A is a flowchart illustrating operations of an electronic device according to an embodiment of the disclosure.

Operations 1401 to 1407 may be performed by an electronic device (e.g., the electronic device 1101 of FIG. 11) or a processor (e.g., the processor 1120 of FIG. 12).

Referring to FIG. 14A, according to an embodiment, the processor 1120 may activate the first communication circuit 1140 to transmit or receive information about the location of the electronic device 1101 (operation 1401). For example, the information about the location of the electronic device 1101 may include information about a request for the location of the electronic device 1101 and location information indicating the location of the electronic device 1101.

The processor 1120 may determine whether the second communication circuit 1150 needs to be used for wireless communication (operation 1403). For example, when there is a need for updating the software of the electronic device 1101, downloading or uploading a high volume of data, and/or downloading or uploading data of high importance, the processor 1120 may determine that the second communication circuit 1150 needs to be used.

The processor 1120 may determine the state (e.g., the state of the power of the battery 1130) of the electronic device 1101 (operation 1405). For example, the processor 1120 may determine the state of the electronic device 1101 based on the amount of power stored in the battery 1130, whether there is external power supplied to the battery 1130, and/or the amount of the external power supplied to the battery 1130.

The processor 1120 may activate the second communication circuit 1150 based on the determined state of the electronic device 1101 (operation 1407). For example, the processor 1120 may update the software of the electronic device 1101 via the activated second communication circuit 1150.

To activate the second communication circuit 1150, the processor 1120 may supply more power than when the second communication circuit 1150 is inactive to the second communication circuit 1150.

Figure 14B:
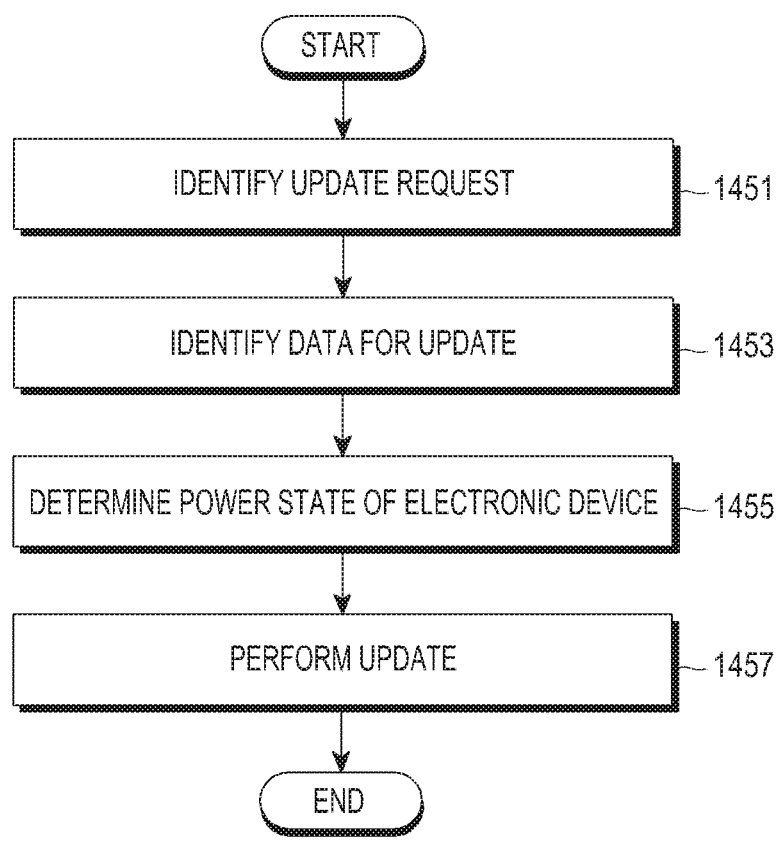

FIG. 14B is a flowchart illustrating operations of an electronic device according to an embodiment of the disclosure.

Operations 1451 to 1457 may be performed by an electronic device (e.g., the electronic device 1101 of FIG. 11) or a processor (e.g., the processor 1120 of FIG. 12).

Referring to FIG. 14B, according to an embodiment, the processor 1120 may identify a request for updating the electronic device 1101 (operation 1451). For example, the processor 1120 may receive information about the request for updating from the server 1180, identifying the update request. The processor 1120 may determine that there is an update request when the electronic device 1101 meets a designated condition. For example, the designated condition may be met when the electronic device 1101 does not perform update during a designated period or the electronic device 1101 escapes off a designated area.

The processor 1120 may identify first data for updating the electronic device 1101 through the update request (operation 1453). For example, the processor 1120 may identify the first data needed for performing update (or which needs to be downloaded) through the update request and may determine the attributes of the identified data. For example, the update request may contain information about the first data (e.g., the attributes of the first data).

The processor 1120 may determine the power state of the electronic device 1101 (operation 1455). For example, the processor 1120 may determine the amount of power stored in the battery 1130 and/or the power supply state of the battery 1130.

The processor 1120 may perform update based on the results of the determination. For example, when the electronic device 1101 is in the state of being appropriate for updating, the processor 1120 may perform update. Unless the electronic device 1101 is in the state of being appropriate for updating, the processor 1120 may not perform update.

Figure 15:
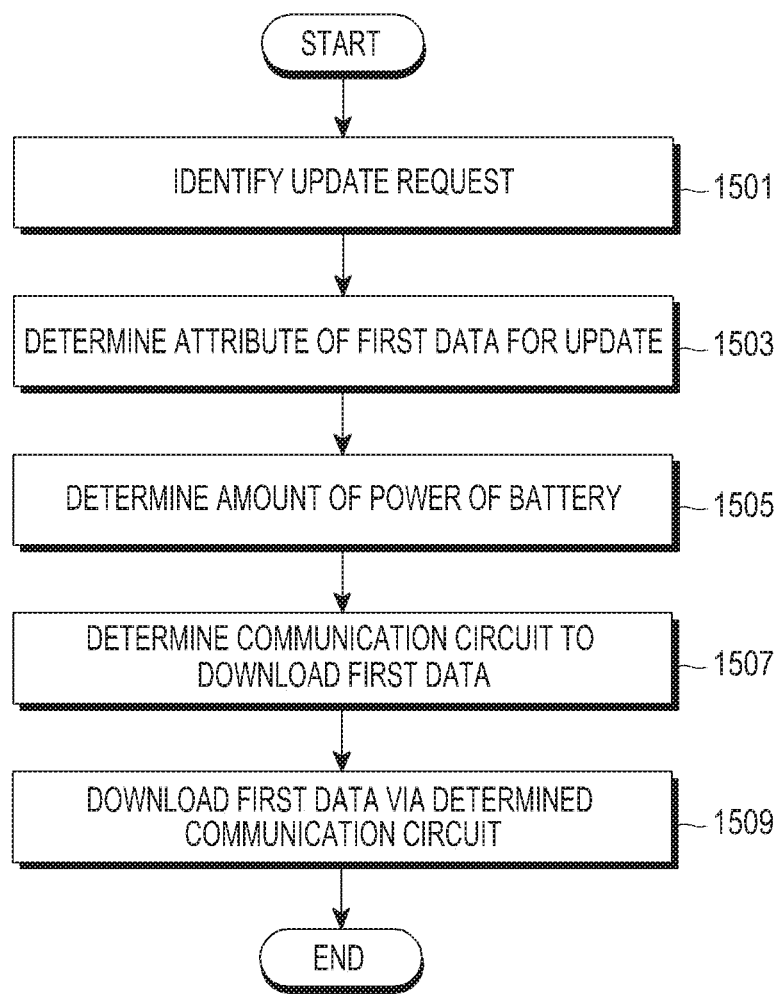
FIG. 15 is a flowchart illustrating an updating operation by an electronic device according to an embodiment of the disclosure.

FIG. 15 is a flowchart illustrating an updating operation by an electronic device according to an embodiment of the disclosure.

Operations 1501 to 1509 may be performed by an electronic device (e.g., the electronic device 1101 of FIG. 11) or a processor (e.g., the processor 1120 of FIG. 12).

Referring to FIG. 15, according to an embodiment, the processor 1120 may identify a request for updating the electronic device 1101 (operation 1501).

The processor 1120 may determine the attributes of first data for updating through the update request (operation 1503). For example, the processor 1120 may determine the importance and/or size of the first data.

The processor 1120 may determine the amount of power of the battery 1130 (operation 1505). For example, the amount of power of the battery 1130 may be determined based on the amount of power stored in the battery 1130 and the amount of power supplied to the battery 1130. For example, the processor 1120 may determine the amount of power of the battery 1130 based on the current amount of power (or remaining power) stored in the battery 1130, whether there is power supplied from a charger to the battery 1130, and/or the amount of power supplied from the charger to the battery 1130.

The processor 1120 may determine whether the amount of power of the battery 1130 is sufficient to perform update. When the amount of power of the battery 1130 is sufficient to perform update, the processor 1120 may download first data for updating from the server 1180.

The processor 1120 may determine a communication circuit to download the first data among a plurality of communication circuits (e.g., the first communication circuit 1140 and the second communication circuit 1150) (operation 1507). For example, the processor 1120 may determine the communication circuit to download the first data given the power consumption and/or transmission speed.

The processor 1120 may download the first data via the communication circuit (operation 1509). For example, the processor 1120 may download the first data via the first communication circuit or the second communication circuit.

Figure 16:
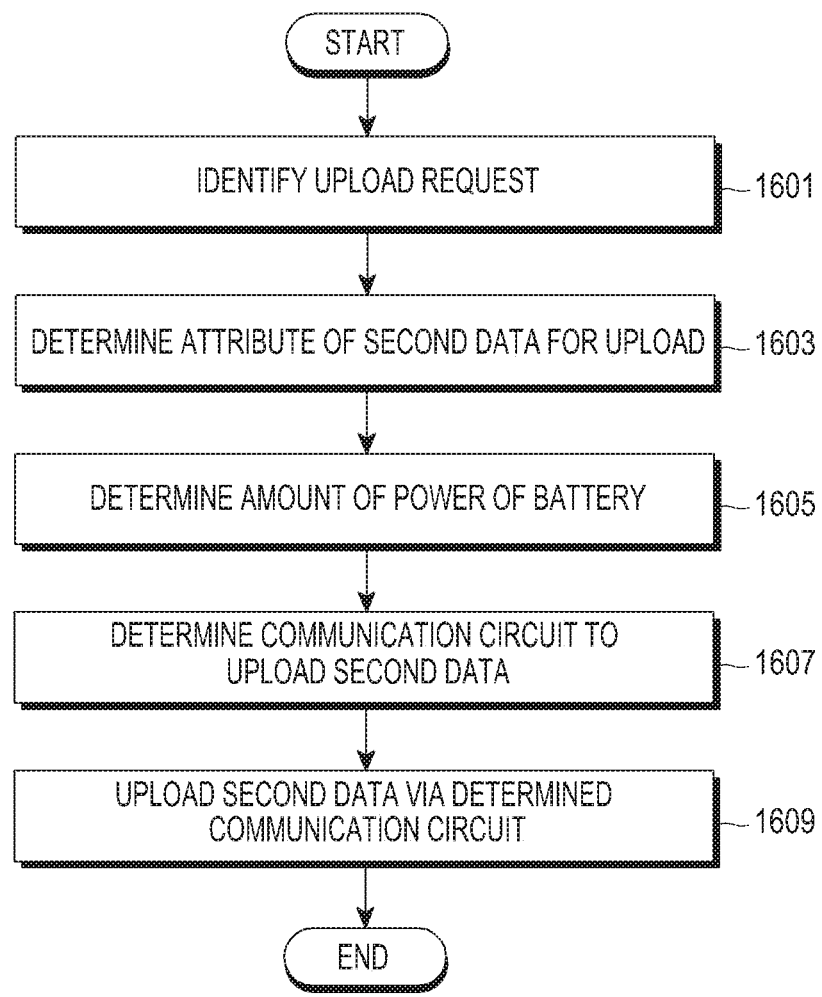
FIG. 16 is a flowchart illustrating an uploading operation by an electronic device according to an embodiment of the disclosure.

FIG. 16 is a flowchart illustrating an uploading operation by an electronic device according to an embodiment of the disclosure.

Operations 1601 to 1609 may be performed by an electronic device (e.g., the electronic device 1101 of FIG. 11) or a processor (e.g., the processor 1120 of FIG. 12).

Referring to FIG. 16, according to an embodiment, the processor 1120 may identify a request for upload by the electronic device 1101 (operation 1601). For example, when the electronic device 1101 does not perform upload or the second data (e.g., information about the Wi-Fi AP not included in the Wi-Fi AP list registered in the server 1180) stored in the memory 1170 has a designated size or more, the processor 1120 may determine that there is an upload request.

The processor 1120 may determine the attributes of the second data for upload through the upload request (operation 1603). For example, the processor 1120 may determine the importance and/or size of the second data to be uploaded to the server 1180.

The processor 1120 may determine the amount of power of the battery 1130 (operation 1605). The processor 1120 may determine whether the amount of power of the battery 1130 is sufficient to perform upload. When the amount of power of the battery 1130 is sufficient to perform upload, the processor 1120 may upload the second data for upload to the server 1180.

The processor 1120 may determine a communication circuit to upload the second data among a plurality of communication circuits (e.g., the first communication circuit 1140 and the second communication circuit 1150) (operation 1607). For example, the processor 1120 may determine the communication circuit to upload the second data given the power consumption and/or transmission speed.

The processor 1120 may upload the second data via the determined communication circuit (operation 1609). For example, the processor 1120 may upload the second data via first wireless communication or the second wireless communication.

Figure 17:
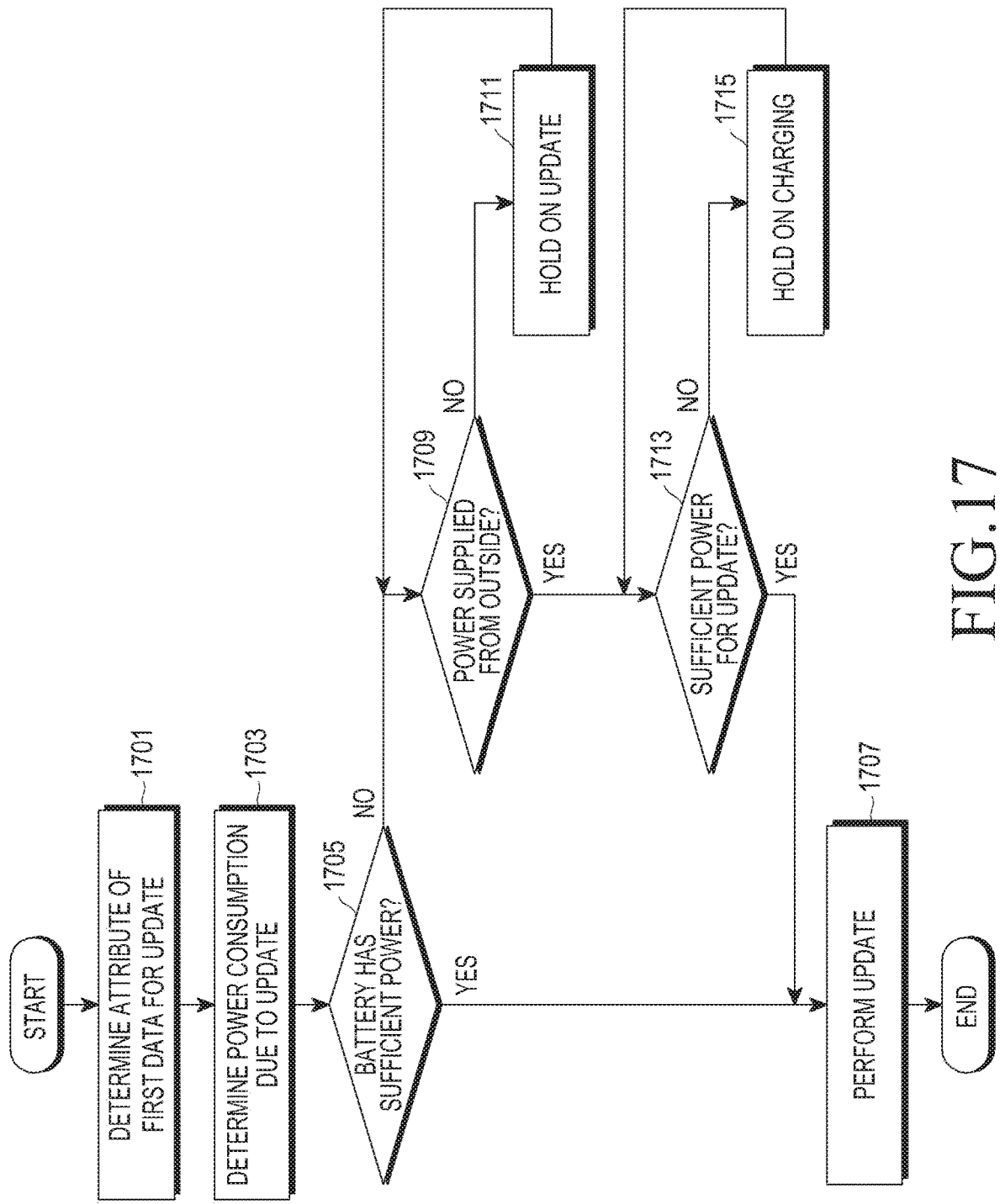
FIG. 17 is a flowchart illustrating an updating operation by an electronic device according to an embodiment of the disclosure.

FIG. 17 is a flowchart illustrating an updating operation by an electronic device according to an embodiment of the disclosure.

Operations 1701 to 1715 may be performed by an electronic device (e.g., the electronic device 1101 of FIG. 11) or a processor (e.g., the processor 1120 of FIG. 12).

Referring to FIG. 17, the processor 1120 may determine the attributes of the first data for update (operation 1701). For example, the processor 1120 may determine the importance and/or size of the first data.

The processor 1120 may determine the power consumption due to update (operation 1703). For example, the processor 1120 may download the first data based on the size of the first data and may determine the power consumption needed to install the downloaded first data onto the electronic device 1101. For example, the processor 1120 may determine the power consumption corresponding to the size of the first data using a mapping table and/or a particular algorithm.

The processor 1120 may determine whether the amount of power stored in the battery 1130 is sufficient to perform update (operation 1705).

When the power stored in the battery 1130 is sufficient to perform update (yes of operation 1705), the processor 1120 may perform update (operation 1707).

Unless the power stored in the battery 1130 is sufficient to perform update (no of operation 1705), the processor 1120 may determine whether power is supplied from an external charger to the battery 1130 (operation 1709).

When no power is supplied to the battery 1130 (no of operation 1709), the processor 1120 may hold on update (operation 1711). For example, the processor 1120 may not perform update to prevent failure to update due to power shortage. The processor 1120 may hold on update until power necessary for update is supplied.

When power is supplied to the battery 1130 (yes of operation 1709), the processor 1120 may determine whether the current amount of power stored in the battery 1130 and the power supplied from the outside are sufficient to perform update (operation 1713). For example, the processor 1120 may determine whether the power is sufficient to perform update based on the charging capacity of the charger supplying the power.

When the supplied power is insufficient to perform update (no of operation 1713), the processor 1120 may hold on update until the battery 1130 is charged with power needed for update (operation 1715).

When power sufficient for update is supplied (yes of operation 1713), the processor 1120 may perform update (operation 1707).

Figure 18:
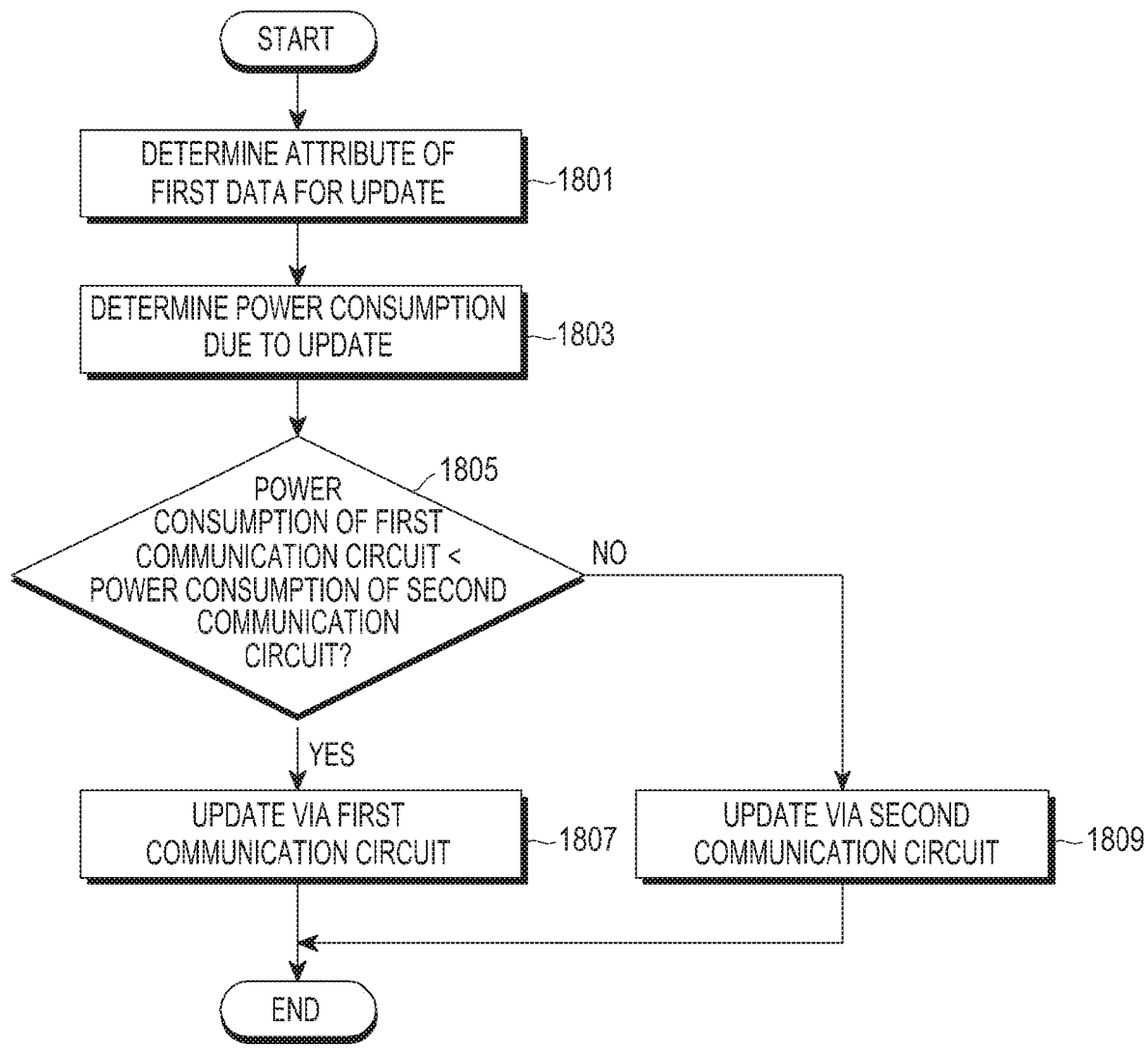
FIG. 18 is a flowchart illustrating an updating operation by an electronic device according to an embodiment of the disclosure.

FIG. 18 is a flowchart illustrating an updating operation by an electronic device according to an embodiment of the disclosure.

Operations 1801 to 1809 may be performed by an electronic device (e.g., the electronic device 1101 of FIG. 11) or a processor (e.g., the processor 1120 of FIG. 12).

Referring to FIG. 18, according to an embodiment, the processor 1120 may determine the attributes of the first data for update (operation 1801). For example, the processor 1120 may determine the importance and/or size of the first data.

The processor 1120 may determine the power consumption due to update (operation 1803). For example, the processor 1120 may determine the power consumption needed to download the first data via the first communication circuit 1140 and the power consumption needed to download the first data via the second communication circuit 1150. For example, the processor 1120 may determine the power consumption based on the time of downloading the first data via each of the first communication circuit 1140 and the second communication circuit 1150 and the driving power of each of the first communication circuit 1140 and the second communication circuit 1150.

The processor 1120 may compare the power consumption needed to download the first data via the first communication circuit 1140 with the power consumption needed to download the first data via the second communication circuit 1150.

The processor 1120 may use the less power consuming one of the first communication circuit 1140 and the second communication circuit 1150.

When the power consumption of the first communication circuit 1140 is smaller than the power consumption of the second communication circuit 1150 (yes of operation 1805), the processor 1120 may download the first data via the first communication circuit 1140 and perform update (operation 1807).

Unless the power consumption of the first communication circuit 1140 is smaller than the power consumption of the second communication circuit 1150 (no of operation 1805), the processor 1120 may download the first data via the second communication circuit 1150 and perform update (operation 1809).

Figure 19A:
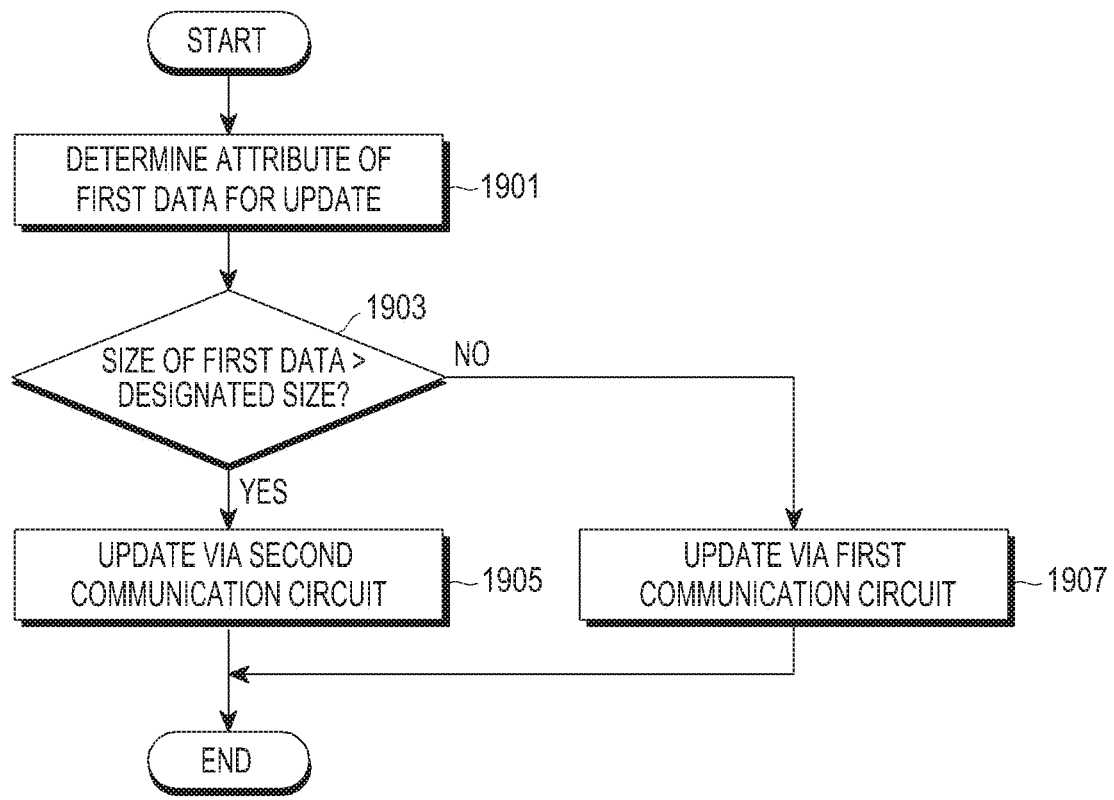
FIG. 19A is a flowchart illustrating an updating operation by an electronic device according to an embodiment of the disclosure.

FIG. 19A is a flowchart illustrating an updating operation by an electronic device according to an embodiment.

Operations 1901 to 1907 may be performed by an electronic device (e.g., the electronic device 1101 of FIG. 11) or a processor (e.g., the processor 1120 of FIG. 12).

Referring to FIG. 19A, according to an embodiment, the processor 1120 may determine the attributes of the first data for update (operation 1901). For example, the processor 1120 may determine the importance and/or size of the first data.

According to an embodiment, the processor 1120 may determine whether the size of the first data is larger than a designated size (operation 1903). For example, the designated size may be set by the user or the processor 1120.

When the size of the first data is larger than the designated size (yes of operation 1903), the processor 1120 may download the first data via the second communication circuit 1150 and perform update (operation 1905).

Unless the size of the first data is larger than the designated size (no of operation 1903), the processor 1120 may download the first data via the first communication circuit 1140 and perform update (operation 1907).

Figure 19B:
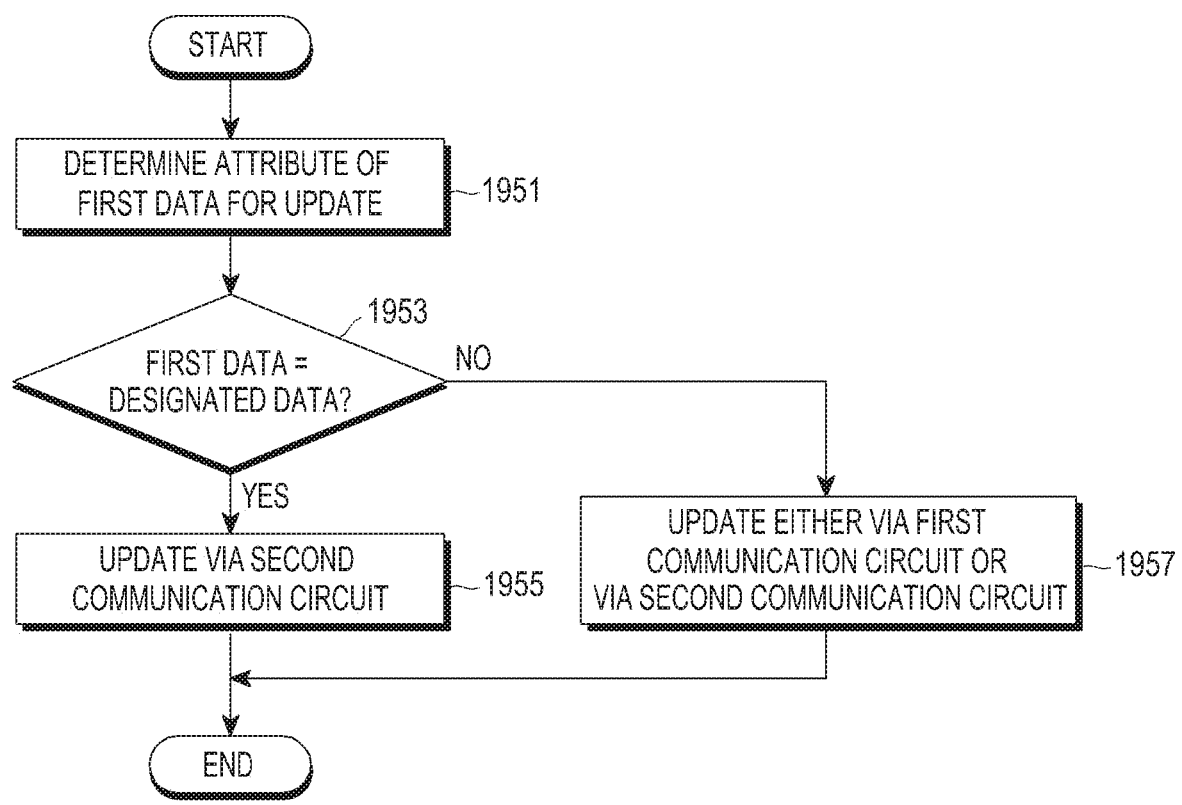
FIG. 19B is a flowchart illustrating an updating operation by an electronic device according to an embodiment of the disclosure.

FIG. 19B is a flowchart illustrating an updating operation by an electronic device according to an embodiment of the disclosure.

Operations 1951 to 1957 may be performed by an electronic device (e.g., the electronic device 1101 of FIG. 11) or a processor (e.g., the processor 1120 of FIG. 12).

Referring to FIG. 19B, according to an embodiment, the processor 1120 may determine the attributes of the first data for update (operation 1951). For example, the processor 1120 may determine the name (or type), importance and/or size of the first data.

According to an embodiment, the processor 1120 may determine whether the first data is designated data (operation 1953). For example, the designated data may be information about a Wi-Fi AP list and/or information about a database managed by the server 1180 to provide a cloud service via the server 1180. The designated data may be set by the user or the processor 1120.

When the first data is the designated data (yes of operation 1953), the processor 1120 may download the first data via the second communication circuit 1150 and perform update (operation 1955).

Unless the first data is the designated data (no of operation 1953), the processor 1120 may download the first data via either the first communication circuit 1140 or the second communication circuit 1150 and perform update (operation 1957). For example, the processor 1120 may determine the communication circuit to download the first data based on the power state of the battery 1130 and/or the data transmission rate.

Figure 20:
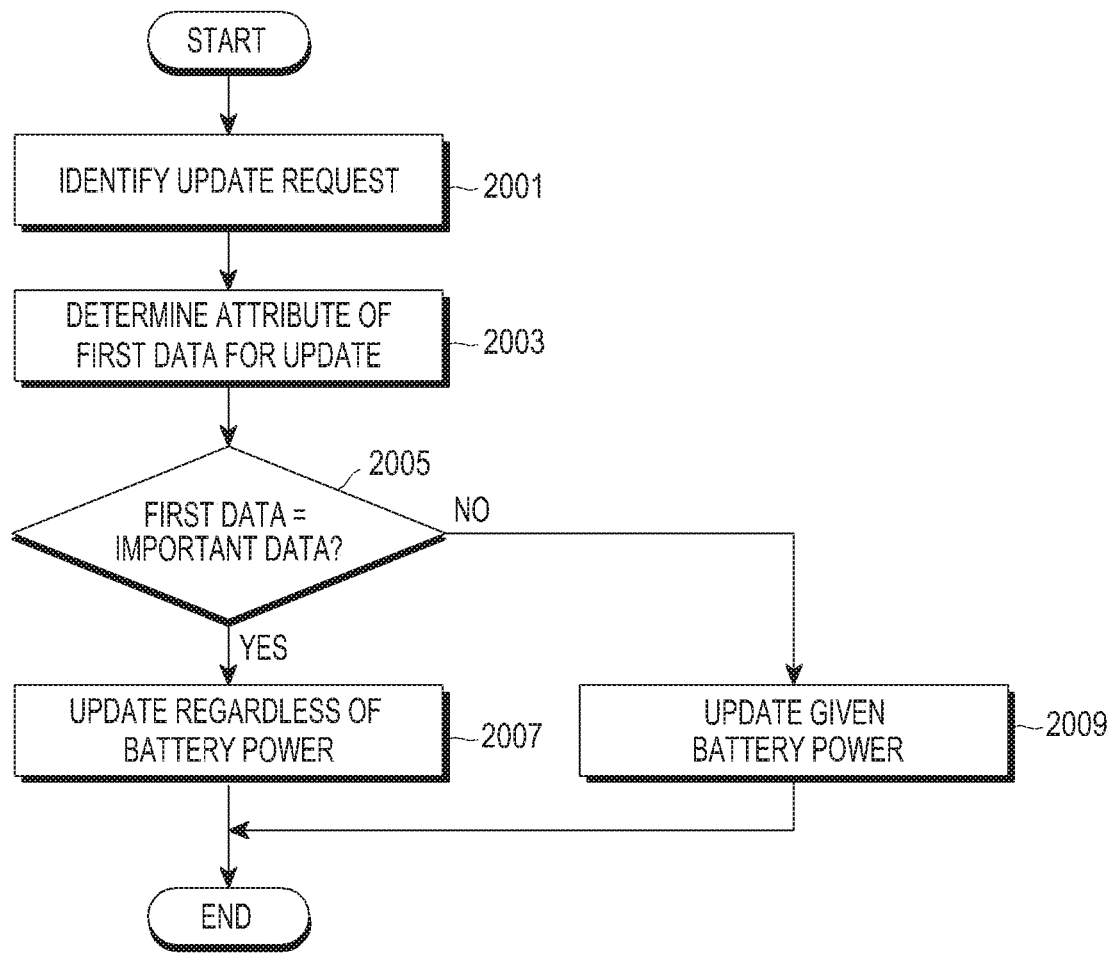
FIG. 20 is a flowchart illustrating an updating operation by an electronic device according to an embodiment of the disclosure.

FIG. 20 is a flowchart illustrating an updating operation by an electronic device according to an embodiment of the disclosure.

Operations 2001 to 2009 may be performed by an electronic device (e.g., the electronic device 1101 of FIG. 11) or a processor (e.g., the processor 1120 of FIG. 12).

Referring to FIG. 20, according to an embodiment, the processor 1120 may identify a request for updating the electronic device 1101 (operation 2001).

The processor 1120 may determine the attributes of first data for updating through the update request (operation 2003). For example, the processor 1120 may determine the importance and/or size of the first data.

The processor 1120 may determine the importance of the first data (operation 2005). For example, when the first data is included in the designated data, the processor 1120 may determine that the first data is important data. When a value indicating the importance of the first data is a designated value or more, the processor 1120 may determine that the first data is important data.

When the first data is important data (yes of operation 2005), the processor 1120 may perform update regardless of the power of the battery 1130 (operation 2007). When the importance of the first data is the designated value or more, the processor 1120 may perform update regardless of the power of the battery 1130 (operation 2007). For example, the processor 1120 may determine a communication circuit to download the first data regardless of the amount of power of the battery 1130 and may download the first data via the determined communication circuit and perform update. The processor 1120 may determine the communication circuit based on at least one of power consumption and download speed.

Unless the first data is important data (no of operation 2005), the processor 1120 may perform update based on the amount of power of the battery 1130 (operation 2009). When the importance of the first data is the designated value or more, the processor 1120 may perform update based on the amount of power of the battery 1130 (operation 2009). For example, the processor 1120 may determine a communication circuit to download the first data based on the amount of power of the battery 1130 and may download the first data via the determined communication circuit and perform update.

The operations for updating by the electronic device 1101 described above in connection with FIGS. 17 to 20 may apply likewise to operations of upload by the electronic device 1101.

FIG. 21 is a table illustrating an example of determining a communication scheme as per attributes of data according to an embodiment of the disclosure.

Referring to FIG. 21, a processor (e.g., the processor 1120 of FIG. 11) may determine the attributes of data to be updated or uploaded when there is a request for update or upload.

Data for 'security update' may be high-importance data. The processor 1120 may perform 'security update' either via the first communication circuit 1140 or via the second communication circuit 1150 regardless of the power of the battery. For example, data of 'imminence' may mean data that needs to immediately or rapidly be updated by the electronic device 1101. Data for 'security update' has a very high importance and may thus be data of 'imminence.'

Data for 'small update' may be data the size of which is not larger than a designated size. The processor 1120 may determine whether to perform update based on the power (or power state) of the battery and the size of the data. The processor 1120 may perform 'small update' either via the first communication circuit 1140 or via the second communication circuit 1150 based on the power (or power state) of the battery and the size of the data.

Data for 'large update' may be data the size of which is larger than the designated size. The processor 1120 may determine whether to perform update based on the power (or power state) of the battery and the size of the data. The processor 1120 may perform 'large update' via the second communication circuit 1150.

Data of 'Wi-Fi AP list information' may be contained in designated data. The processor 1120 may determine whether to perform update based on the power (or power state) of the battery and the size of the data. The processor 1120 may update the 'Wi-Fi AP list information' via the second communication circuit 1150.

Figure 22A:
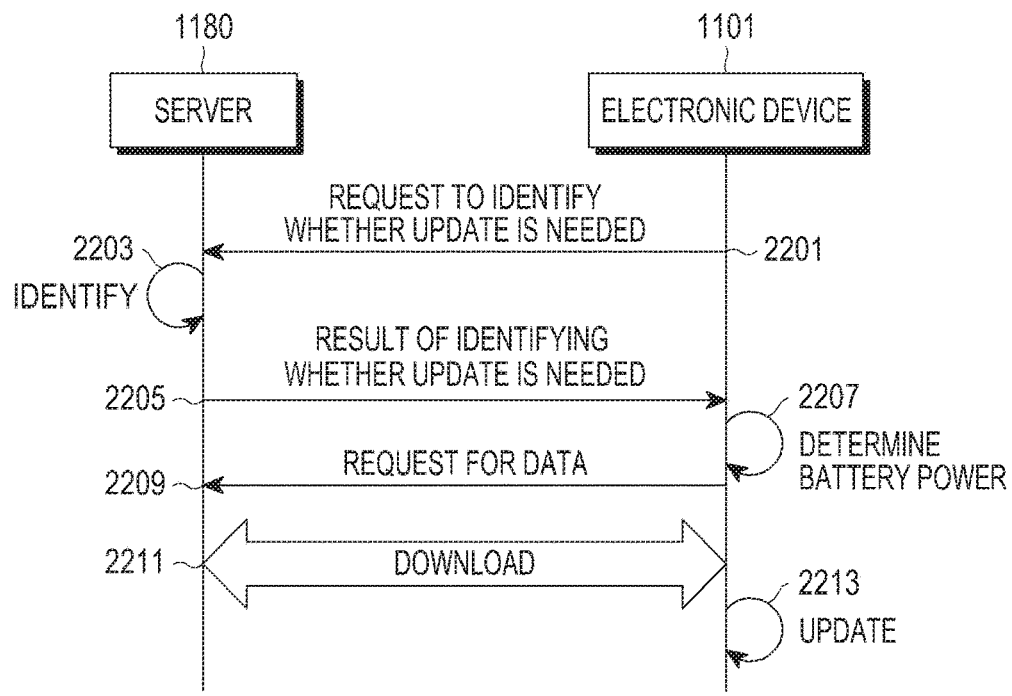
FIG. 22A is a data flow chart illustrating the operation of downloading data from a server by an electronic device according to an embodiment of the disclosure.

FIG. 22A is a data flow chart illustrating the operation of downloading data from a server by an electronic device according to an embodiment of the disclosure.

Operations 2201 to 2213 may be performed by an electronic device (e.g., the electronic device 1101 of FIG. 11) or a processor (e.g., the processor 1120 of FIG. 12).

Referring to FIG. 22A, the electronic device 1101 may send a request for identifying update as to whether update is needed via the first communication circuit 1140 (operation 2201). For example, the electronic device 1101 may transmit the identification request along with information about the electronic device 1101 (e.g., software information about the electronic device 1101) to the server 1180.

The server 1180 may identify whether updating the electronic device 1101 is needed (operation 2203). The server 1180 may identify whether updating the electronic device 1101 is needed based on the information about the electronic device 1101. For example, the server 1180 may identify whether at least one of the 'security update,' 'small update,' or 'large update' is needed based on the information about the electronic device 1101.

The electronic device 1101 may receive a result of identifying update from the server 1180 via the first communication circuit 1140 (operation 2205). For example, the electronic device 1101 may determine whether there is an update request based on the result of identification received from the server 1180.

The electronic device 1101 may determine the power state of the battery 1130, determining whether to perform update (operation 2207). For example, the electronic device 1101 may determine whether the power of the battery 1130 is sufficient to perform update.

Upon determining to perform update, the electronic device 1101 may send a request for first data for update to the server 1180 (operation 2209). For example, the electronic device 1101 may send the request for the first data via the first communication circuit 1140 or the second communication circuit 1150. The electronic device 1101 may determine the communication circuit according to the attributes of the first data. When the type of the first data is 'large data' which is a high volume or the 'information about the Wi-Fi AP list,' the electronic device 1101 may request the first data via the second communication circuit 1150.

The electronic device 1101 may download the first data via the first communication circuit 1140 or the second communication circuit 1150 (operation 2211). The electronic device 1101 may determine the communication circuit according to the attributes of the first data. When the type of the first data is 'large data' which is a high volume or the 'information about the Wi-Fi AP list,' the electronic device 1101 may download the first data via the second communication circuit 1150.

The electronic device 1101 may update the electronic device 1101 using the downloaded first data (operation 2213).

Figure 22B:
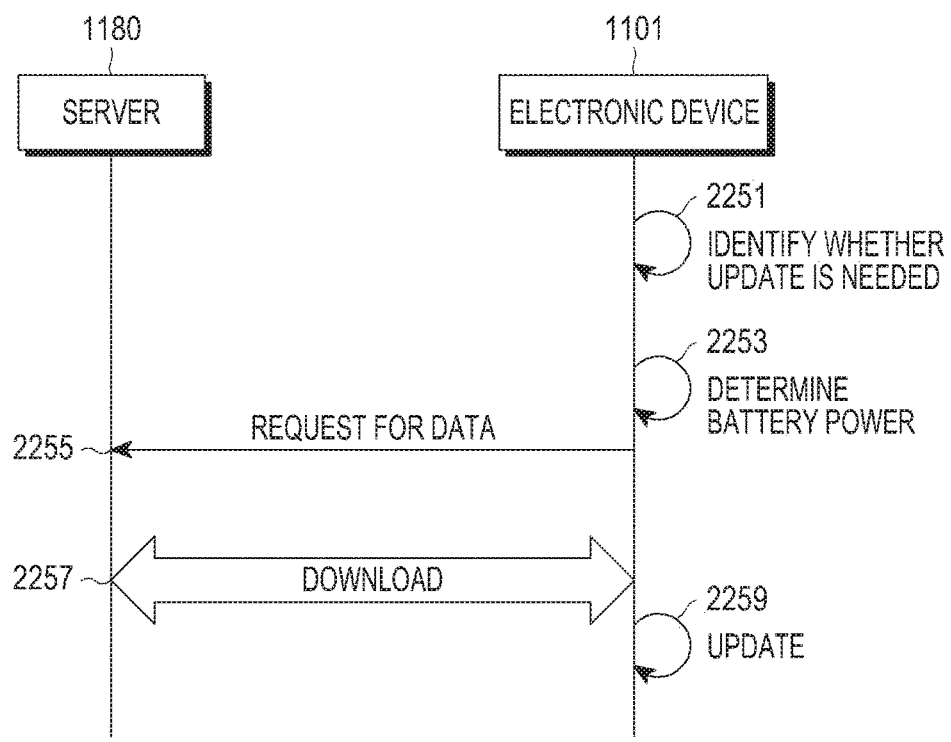
FIG. 22B is a data flow chart illustrating the operation of downloading data from a server by an electronic device according to an embodiment of the disclosure.

FIG. 22B is a data flow chart illustrating the operation of downloading data from a server by an electronic device according to an embodiment of the disclosure.

Operations 2251 to 2259 may be performed by an electronic device (e.g., the electronic device 1101 of FIG. 11) or a processor (e.g., the processor 1120 of FIG. 12). For example, the electronic device 1101 may perform a rebooting operation for update.

Referring to FIG. 22B, the electronic device 1101 may identify the update request (operation 2251). For example, when no update has been performed during a designated period, the electronic device 1101 may determine that update is needed. For example, when the information about the Wi-Fi AP list has not been updated during the designated period, the electronic device 1101 may determine that update is needed.

The electronic device 1101 may determine the power state of the battery 1130, determining whether to perform update (operation 2253). For example, the electronic device 1101 may determine whether the power of the battery 1130 is sufficient to perform update.

Upon determining to perform update, the electronic device 1101 may send a request for first data for update to the server 1180 (operation 2255). For example, the electronic device 1101 may send the request for the first data via the first communication circuit 1140 or the second communication circuit 1150. When the first data is 'large data' or the 'information about the Wi-Fi AP list,' the electronic device 1101 may request the first data via the second communication circuit 1150.

The electronic device 1101 may download, from the server 1180, the first data via the first communication circuit 1140 or the second communication circuit 1150 (operation 2257). The electronic device 1101 may determine the communication circuit according to the attributes of the first data. When the type of the first data is 'large data' which is a high volume or the 'information about the Wi-Fi AP list,' the electronic device 1101 may download the first data via the second communication circuit 1150.

The electronic device 1101 may update the electronic device 1101 using the downloaded first data (operation 2259). For example, the electronic device 1101 may perform a rebooting operation for update.

Figure 22C:
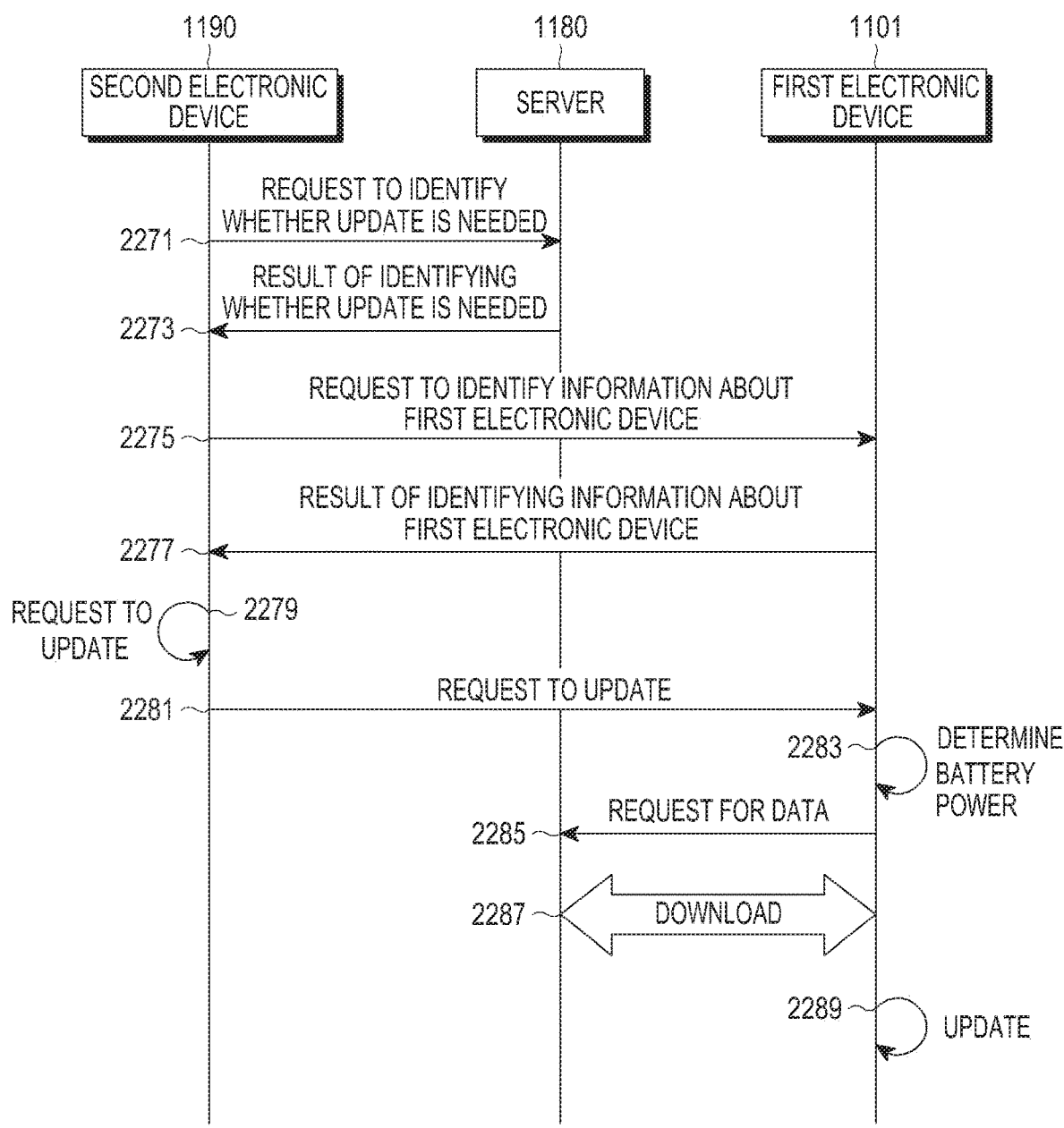
FIG. 22C is a data flow chart illustrating the operation of downloading data from a server by an electronic device according to an embodiment of the disclosure.

FIG. 22C is a data flow chart illustrating the operation of downloading data from a server by an electronic device according to an embodiment of the disclosure.

Operations 2271 to 2289 may be performed by a first electronic device (e.g., the electronic device 1101 of FIG. 11 or a processor (e.g., the processor 1120 of FIG. 12) and a second electronic device (e.g., the second electronic device 1190 of FIG.

Referring to FIG. 22C, the second electronic device 1190 may send a request for identifying update as to whether the first electronic device 1101 needs to be updated to the server 1180 (operation 2271). For example, the second electronic device 1190 may transmit the identification request along with information about the first electronic device 1101 (e.g., the type or model of the first electronic device 1101) to the server 1180.

The server 1180 may identify whether updating the first electronic device 1101 is needed. The server 1180 may identify whether updating the first electronic device 1101 is needed based on the information (e.g., the type or model of the first electronic device 1101) about the first electronic device 1101. For example, the server 1180 may identify whether to add new firmware data for the first electronic device 1101 or new data for indoor positioning (or outdoor positioning) based on the information about the first electronic device 1101.

The second electronic device 1190 may receive, from the server 1180, the result of identifying whether updating the first electronic device 1101 is needed (operation 2273). For example, the second electronic device 1190 may determine whether there is an update request based on the result of identification received from the server 1180.

Where updating the first electronic device 1101 is needed, the second electronic device 1190 may send a request for identifying the information about the first electronic device 1101 to the first electronic device 1101 (operation 2275). For example, the second electronic device 1190 may send a request for identifying the software version contained in the first electronic device 1101 to the first electronic device 1101.

The second electronic device 1190 may receive the result of identifying the information about the first electronic device 1101 (operation 2277). The second electronic device 1190 may determine whether the first electronic device 1101 needs to be updated based on the received result of identification. For example, the second electronic device 1190 may compare the software version of the first electronic device 1101 with the version of the firmware data stored in the server 1180 and may determine whether updating the first electronic device 1101 is needed depending on the result of the comparison.

When the first electronic device 1101 needs to be updated, the second electronic device 1190 may notify the user that the first electronic device 1101 needs to be updated. For example, the second electronic device 1190 may display a message for requesting to update the first electronic device 1101 via a display (not shown) of the second electronic device 1190.

The second electronic device 1190 may receive a request for update from the user (operation 2279). For example, the second electronic device 1190 may receive a request for update in response to the user's input.

The second electronic device 1190 may send a request for updating the first electronic device 1101 to the first electronic device 1101 (operation 2281).

In response to the update request received from the second electronic device 1190, the first electronic device 1101 may determine the power state of the battery 1130 and determine whether to update (operation 2283). For example, the first electronic device 1101 may determine whether the power of the battery 1130 is sufficient to perform update.

Upon determining to perform update, the first electronic device 1101 may send a request for first data for update to the server 1180 (operation 2285). For example, the first electronic device 1101 may send the request for the first data via the first communication circuit 1140 or the second communication circuit 1150. The first electronic device 1101 may determine the communication circuit according to the attributes of the first data. When the type of the first data is 'large data' which is a high volume or the 'information about the Wi-Fi AP list,' the first electronic device 1101 may request the first data via the second communication circuit 1150.

The first electronic device 1101 may download the first data via the first communication circuit 1140 or the second communication circuit 1150 (operation 2287). The first electronic device 1101 may determine the communication circuit according to the attributes of the first data. When the type of the first data is 'large data' which is a high volume or the 'information about the Wi-Fi AP list,' the first electronic device 1101 may download the first data via the second communication circuit 1150.

The first electronic device 1101 may update the electronic device 1101 using the downloaded first data (operation 2289). For example, the first electronic device 1101 may perform a rebooting operation for update.

Although FIG. 22C illustrates that the second electronic device 1190 directly transmits or receives data to/from the first electronic device 1101, embodiments of the disclosure are not limited thereto. For example, the second electronic device 1190 may transmit or receive data to/from the first electronic device 1101 via a server (e.g., the second server 1185 of FIG. 11).

Figure 23:
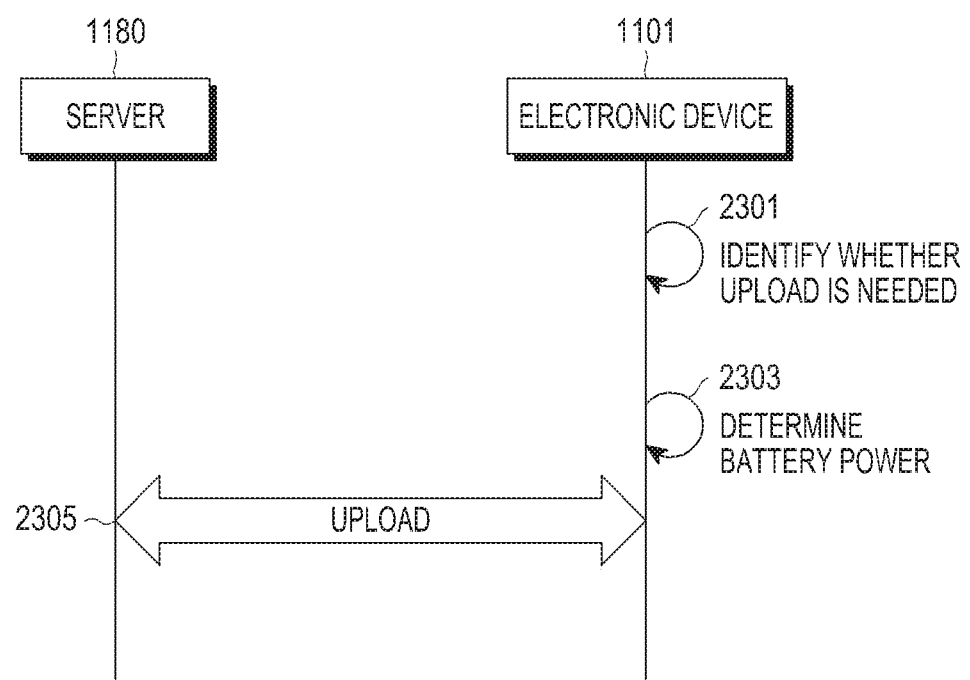
FIG. 23 is a data flow chart illustrating the operation of uploading data to a server by an electronic device according to an embodiment of the disclosure.

FIG. 23 is a data flow chart illustrating the operation of uploading data to a server by an electronic device according to an embodiment of the disclosure.

Operations 2301 to 2305 may be performed by an electronic device (e.g., the electronic device 1101 of FIG. 11) or a processor (e.g., the processor 1120 of FIG. 12).

Referring to FIG. 23, the electronic device (e.g., the electronic device 1101 of FIG. 11) may identify the upload request (operation 2301). For example, when no update has been performed during a designated period, the electronic device 1101 may determine that upload is needed. When the size of data stored in the memory 1170 is a designated size or more, the electronic device 1101 may determine that upload is needed.

The electronic device 1101 may identify the attributes of the second data that needs to be uploaded.

The electronic device 1101 may determine the power state of the battery 1130 based on the attributes of the second data and determine whether to perform upload (operation 2303). For example, the electronic device 1101 may determine whether the power of the battery 1130 is sufficient to perform upload.

Upon determining to upload, the electronic device 1101 may upload, to the server 1180, the second via the first communication circuit 1140 or the second communication circuit 1150 (operation 2305).

According to an embodiment, an electronic device may comprise a housing, a first communication circuit configured to provide first wireless communication using a LPWAN, a second communication circuit configured to provide second wireless communication using Wi-Fi, a battery configured to supply power to the first communication circuit and the second communication circuit, and a control circuit configured to control the battery to supply power to the first communication circuit as default, determine whether the second communication circuit needs to be used for wireless communication, determine at least one state of the electronic device, and control the battery to supply power to the second communication circuit based on the at least one state.

The control circuit may include a processor and a memory disposed in the housing and electrically connected with the processor.

The control circuit may be configured to determine whether the second communication circuit needs to be used based on information received via the first communication circuit.

The information may include information about a software update to the electronic device.

The at least one state may include remaining power of the battery.

The at least one state may include a state about whether the electronic device receives power from an external power source.

The control circuit may be configured to provide a first amount of power to the second communication circuit while the second communication circuit is inactive and provide a second amount of power larger than the first amount of power to the second communication circuit to keep the second communication circuit in an active state.

According to an embodiment, an electronic device may comprise a battery, a first communication circuit configured to provide first wireless communication using a LPWAN, a second communication circuit configured to provide second wireless communication using Wi-Fi, and a processor configured to, upon receiving a request for location information about the electronic device, transmit the location information via the first wireless communication of the electronic device to a server, upon receiving a request for updating the electronic device, select the first wireless communication or the second wireless communication to download first data for the update based on at least one of an attribute of the first data or a power state of the battery, and download the first data from a server via the selected wireless communication and perform the update.

The processor may be configured to, upon receiving the request for the update, determine whether to perform the update based on the attribute of the first data and the power state of the battery.

The processor may be configured to determine a first power consumption of the battery needed to download the first data and a second power consumption of the battery needed to install the first data based on a size of the first data and determine whether to perform the update based on the first power consumption and the second power consumption.

The processor may be configured to, when power is supplied to the battery via an external electronic device, determine whether to perform the update based on an amount of power stored in the battery and the supplied power.

The processor may be configured to determine a power consumption needed to download the first data via each of the first communication circuit and the second communication circuit based on a size of the first data and download the first data either via the first communication circuit or via the second communication circuit based on the determined power consumption.

The processor may be configured to download the first data via the second communication circuit when the size of the first data exceeds a designated size.

The processor may be configured to download the first data via the second communication circuit from the server when the first data is designated data.

The processor may be configured to download the first data either via the first communication circuit or via the second communication circuit regardless of power of the battery when the first data is the designated data.

The electronic device may be configured to store information about a Wi-Fi AP to position the electronic device using the second communication circuit. When the information about the Wi-Fi AP is not updated during a designated period, the processor may be configured to send a request for the update.

The processor may be configured to, upon receiving a request for uploading second data stored in the electronic device, determine whether to perform the upload based on a power state of the battery and an attribute of the second data for the upload, determine a wireless communication among the first wireless communication and the second wireless communication to upload the second data, and upload the second data to the server via the determined wireless communication.

The application of the first data may include at least one of a name, size, type, or importance of the first data.

According to an embodiment, a method for operating an electronic device may comprise, upon receiving a request for location information about the electronic device, transmitting the location information via first wireless communication to a server, upon receiving a request for updating the electronic device, selecting the first wireless communication using a LPWAN or a second wireless communication using Wi-Fi to download first data for the update based on at least one of an attribute of the first data or a power state of a battery included in the electronic device, and downloading the first data from a server via the selected wireless communication and performing the update.

The processor may be configured to, upon receiving the request for the update, determine whether to perform the update based on the attribute of the first data and the power state of the battery.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

As is apparent from the foregoing description, according to various embodiments, an electronic device may smoothly perform update in an appropriate communication scheme among a low-power wide area communication scheme and other communication schemes as per the attributes of data and the battery power.

According to various embodiments, an electronic device may prevent an update failure due to battery power consumption given the power state of the battery or the use time as per the communication scheme in downloading data for update and performing update.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
   a housing;
   a first-narrow-band internet-of things (NBIOT) communication circuit;
   a wireless-fidelity (Wi-Fi) communication circuit;
   a battery configured to supply power to the NBIOT communication circuit and
   the Wi-Fi communication circuit; and
   at least one processor configured to:
      control the battery to supply power to the NBIOT communication circuit as default,
      identify whether the Wi-Fi communication circuit needs to be used for wireless communication,
      in response to identifying that the Wi-Fi communication circuit needs to be used for wireless communication, identify a power state of the battery, and
      control the battery to supply power to the Wi-Fi communication circuit based on the power state of the battery,
   wherein the at least one processor is further configured to identify whether the Wi-Fi communication circuit needs to be used based on information received via the first NBIOT communication circuit, and wherein the information includes information about a software update to the electronic device.
2. The electronic device of claim 1, wherein the at least one processor includes a processor and a memory electrically connected with the processor.
3. The electronic device of claim 1, wherein the power state of the battery includes a remaining power state of the battery.
4. The electronic device of claim 1, wherein the at least one state includes a state about whether the electronic device receives power from an external power source.
5. The electronic device of claim 1, wherein the at least one processor is further configured to:
   provide a first amount of power to the second communication circuit while the second communication circuit is inactive, and provide a second amount of power larger than the first amount of power to the second communication circuit to keep the second communication circuit in an active state.

* * * * *